United States Patent
Zhang et al.

(10) Patent No.: US 11,330,599 B2
(45) Date of Patent: May 10, 2022

(54) GENERATION AND TRANSMISSION OF RESOURCE ALLOCATION INFORMATION ACCORDING TO INTERFERENCES AND ALTITUDE

(71) Applicant: Sony Corporation, Tokyo (JP)

(72) Inventors: Yuan Zhang, Nanjing (CN); Penshun Lu, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 16/643,592

(22) PCT Filed: Sep. 14, 2018

(86) PCT No.: PCT/CN2018/105642
§ 371 (c)(1),
(2) Date: Mar. 2, 2020

(87) PCT Pub. No.: WO2019/056983
PCT Pub. Date: Mar. 28, 2019

(65) Prior Publication Data
US 2020/0245340 A1 Jul. 30, 2020

(30) Foreign Application Priority Data
Sep. 21, 2017 (CN) .......................... 201710861636.9

(51) Int. Cl.
*H04W 72/08* (2009.01)
*H04J 11/00* (2006.01)
(Continued)

(52) U.S. Cl.
CPC ......... *H04W 72/082* (2013.01); *H04J 11/005* (2013.01); *H04L 5/0032* (2013.01);
(Continued)

(58) Field of Classification Search
CPC ... H04W 24/00; H04W 24/10; H04W 5/0073; H04W 5/0035; H04W 5/0058;
(Continued)

(56) References Cited

U.S. PATENT DOCUMENTS

| 5,123,112 A | * | 6/1992 | Choate | ................... | H04B 7/185 370/329 |
| 5,212,804 A | * | 5/1993 | Choate | ................... | H04B 7/185 455/431 |

(Continued)

FOREIGN PATENT DOCUMENTS

| CN | 102469601 A | 5/2012 |
| CN | 104053158 A | 9/2014 |

(Continued)

OTHER PUBLICATIONS

Partial Supplementary European Search Report dated Nov. 20, 2020 in European Patent Application No. 18 859 764.5, 19 pages.

(Continued)

*Primary Examiner* — Warner Wong
(74) *Attorney, Agent, or Firm* — Xsensus LLP

(57) ABSTRACT

The present disclosure relates to an electronic apparatus, a method and a computer-readable storage medium for a wireless communication system. The electronic apparatus for a wireless communication system according to the present disclosure comprises: a processing circuit, configured to generate resource allocation information according to interference conditions encountered by user equipment (UE), wherein a current altitude of the UE is higher than an altitude threshold, and sending the resource allocation information to base station equipment of other cells apart from neighboring cells of a current serving cell of the UE, so as to configure information sending resources for the base station equipment of the other cells. The electronic device, method and computer-readable storage medium of the pres- (Continued)

ent disclosure are capable of reducing information interference generated in a wireless communication system of an unmanned aerial vehicle device.

17 Claims, 10 Drawing Sheets

(51) Int. Cl.
*H04L 5/00* (2006.01)
*H04W 24/10* (2009.01)
*H04W 72/04* (2009.01)
*H04W 28/02* (2009.01)
*H04W 28/26* (2009.01)

(52) U.S. Cl.
CPC .......... *H04L 5/0073* (2013.01); *H04W 24/10* (2013.01); *H04W 72/0426* (2013.01); *H04W 28/0236* (2013.01); *H04W 28/26* (2013.01)

(58) Field of Classification Search
CPC ............. H04W 72/0426; H04W 72/04; H04W 72/0406; H04W 72/0413; H04W 72/042; H04W 28/0236; H04W 36/06; H04W 36/20; H04W 28/26; H04J 11/005; H04J 11/0053; H04J 2203/0067; H04L 5/0032; H04L 5/03; H04L 5/0035; H04L 2012/5631; H04L 47/70; H04L 47/783
See application file for complete search history.

(56) References Cited

U.S. PATENT DOCUMENTS

| | | | |
|---|---|---|---|
| 9,537,561 | B1 | 1/2017 | Kotecha et al. |
| 9,762,272 | B1* | 9/2017 | Thirukannan ......... H04L 25/021 |
| 2016/0006529 | A1 | 1/2016 | Yi et al. |
| 2016/0205560 | A1 | 7/2016 | Hyslop et al. |
| 2017/0255206 | A1* | 9/2017 | Chen ...................... G01S 19/48 |
| 2019/0012923 | A1* | 1/2019 | Weisbrod ............. G08G 5/0069 |
| 2019/0327007 | A1* | 10/2019 | Wang ................ H04W 72/0426 |
| 2020/0099441 | A1* | 3/2020 | Stein ....................... B64D 45/00 |
| 2020/0154426 | A1* | 5/2020 | Takacs ................... G08G 5/003 |
| 2020/0245174 | A1* | 7/2020 | Lu .......................... H04W 24/08 |
| 2020/0245175 | A1* | 7/2020 | Zhang ............... H04W 72/0453 |
| 2020/0252941 | A1* | 8/2020 | Schmidt .............. H04W 72/082 |
| 2020/0264636 | A1* | 8/2020 | Zhang .................. G08G 5/0039 |
| 2020/0287617 | A1* | 9/2020 | Bienas ............... H04B 7/18506 |
| 2021/0144626 | A1* | 5/2021 | Han ....................... H04W 48/12 |

FOREIGN PATENT DOCUMENTS

| | | |
|---|---|---|
| CN | 104571131 A | 4/2015 |
| CN | 105717946 A | 6/2016 |

OTHER PUBLICATIONS

KDDI, "Proposal of potential LTE enhancements for Aerial Vehicles", 3GPP TSG-RAN2 Meeting #98, R2-1705999, Hangzhou, China, May 15-19, 2017, XP051285864, 5 pages.
Sequans Communications, "Interference Mitigation for Aerial Vehicles", 3GPP TSG-RAN WG1 #90, R1-1714071, Prague, P.R. Czechia, Aug. 21-25, 2017, XP051316861, 14 pages.
International Search Report and Written Opinion dated Dec. 5, 2018 for PCT/CN2018/105642 filed on Sep. 14, 2018, 8 pages including English Translation of the International Search Report.
Huawei et al: "Interference mitigation for Drones",3GPP Draft; R2-1704998 Interference Mitigation for Drones, 3rd Generation Partnership Project (3GPP), Mobilecompetence Centre; 650, Route Des Lucioles ; F-06921 Sophia-Antipolis Cedex; France vol. RAN WG2. no. Hangzhou, China:May 15, 2017-May 19, 2017 May 14, 2017 (May 14, 2017), XP051275501,Retrieved from the Internet: URL http://www.3gpp.org/ftp/Meetings_3GPP_SYNC/RAN2/Docs/ [retrieved on May 14, 2017]* section 2.2 *.
Huawei et al: "Potential enhancements for drones"3GPP Draft; R1-1707016, 3rd Generation Partnership Project (3GPP), MOBiLE Competence Centre; 650, Route Des Lucioles ; F-06921 Sophia-Antipolis Cedex; France, vol. RAN WG1, no. Hangzhou, China:May 15, 2017-May 19, 2017 May 14, 2017 (May 14, 2017), XP051272246,Retrieved from the Internet:URL: http://www.3gpp. org/ftp/Meetings_3GPP_SYNC/RANI/Docs/[retrieved on May 14, 2017]* sections 2-3 *.
NTT Docomo et al:"Initial views on potential problems and solutions for aerial vehicles", 3GPP Draft; R2-1704333 Initial Views on Potential Problems and Solutions for Aerial Vehicles, 3rd Generationpartnership Project (3GPP), Mobile Competence Centre; 650, Route Deslucioles ; F-06921 SO ,vol. RAN WG2, no. Hangzhou; May 15, 2017-May 19, 2017 May 14, 2017 (May 14, 2017), XP051274908,Retrieved from the Internet:URL: http://www.3gpp. org/ftp/Meetings_3GPP_SYNC/RAN2/Docs/[retrieved on May 14, 2017]* p. 3*.
Sony:"Interference mitigation techniques for aerial vehicles". 3GPP Draft; R1-1714055, 3rd Generationpartnership Project (3GPP), Mobile Competence Centre; 650, Route Des Lucioles ; F-06921 Sophia-Antipolis Cedex; France,vol. RAN WGI, no. Prague, Czech Republic;Aug. 21, 2017-Aug. 25, 2017 Aug. 20, 2017 (Aug. 20, 2017), XP051316847, Retrieved from the Internet:URL: http://www. 3gpp.org/ftp/Meetings_3GPP_SYNC/RANI/Docs/[retrieved on Aug. 20, 2017]* section 2 *.
Huawei et al.: "Interference mitigation for Drones", 3GPP Draft; R2-1704998 Inierference Mitigation for Drones, 3rd Generation Partnership Project (3GPP), Mobile Compelence Centre; 650, Route Des Lucioles; F-06921 Sophia-Antipolis Cedex; France vol. RAN WG2, No. Hangzhou, China;May 15, 2017-May 19, 2017 May 14, 2017 (May 14, 2017), XP051275501.
Huawei et al.: "Potential enhancements for drones"3GPP Draft; R1-1707016, 3rd Generation Partnership Project (3GPP), Mobile Compelence Centre; 650, Route Des Lucioles; F-06921 Sophia-Antipolis Cedex; France, vol. RAN WG1, No. Hangzhou, China; May 15, 2017-May 19, 2017 May 14, 2017 (May 14, 2017), XP051272246.
NTT Docomo et al.:potential problems aerial vehiclesl 1, 3GPP Draft; R2-1704333 Initial Views on Potential Problems And.
Huawei et al.: "Interference mitigation for Drones", 3GPP Draft; R2-1704998 Interference Mitigation for Drones, 3rd Generation Partnership Project (3GPP), Mobile Compelence Centre; 650, Route Des Lucioles; F-06921 Sophia-Antipolis Cedex; France vol. RAN WG2, No. Hangzhou, China; May 14, 2017, XP051275501.
Huawei et al.: "Potential enhancements for drones"3GPP Draft: R1-1707016, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017 (May 14, 2017), XP051272246.
NTT Docomo et al.: potential problems aerial vehicles 11, 3GPP Draft; R2-1704333 Initial Views on Potential Problems and Solutions for Aerial Vehicles, 3rd Generation Partnership Project (3GPP), Mobile Competence Centre; 650, Route Des Lucioles; F-06921 SO vol. RAN WG2, May 15, 2017-May 19, 2017, XP051274908.
Sony: "Interference mitigation techniques for aerial vehicles",3GPP DRAFT; R1-1714055, 3rd Generationpartnership Project (3GPP), Mobile Competence Centre; 650, Route Des Lucioles; F-06921 Sophia-Antipolis Cedex; France,vol. RAN WG1, No. Prague, Czech Republic; Aug. 21, 2017-Aug. 25, 2017 Aug. 20, 2017 (Aug. 20, 2017), XP051316847.

* cited by examiner

GENERATION AND TRANSMISSION OF RESOURCE ALLOCATION INFORMATION ACCORDING TO INTERFERENCES AND ALTITUDE

CROSS-REFERENCE TO RELATED APPLICATIONS

This application is based on PCT filing PCT/CN2018/105642, filed Sep. 14, 2018, which claims priority to Chinese Patent Application No. 201710861636.9, filed with the Chinese Patent Office on Sep. 21, 2017, each of which is incorporated by reference in its entirety.

TECHNICAL FIELD

The present disclosure generally relates to the field of wireless communications, and in particular to electronic equipment in a wireless communication system, a wireless communication method performed by electronic equipment in a wireless communication system, and a computer-readable storage medium.

BACKGROUND

Currently, unmanned aerial vehicle (UAV, also referred to as unmanned aircraft) used in a cellular network gains more and more interests in the industry. Commercial uses of UAVs are developed rapidly, such as searching and rescue, monitoring on critical infrastructure, protection of wildlife, flying camera, and monitoring, which will be increasingly used in recent years. The UAV is different from normal ground user equipment (UE) in that, for example, the flight altitude and speed of a UAV are much greater than a ground UE. In a case of a low flight altitude of a UAV (relative to a base station), the UAV may be regarded as a normal UE.

However, in a case of a high flight altitude of a UAV (for example, higher than a base station), an uplink signal from the UAV can be received by more cells because the attenuation of electromagnetic signals is lower in a higher space, and thus the UAV can receive downlink signals from more cells, which may cause interference.

Therefore, it is desired to provide a technical solution to solve the problem of interference in a wireless communication system including unmanned aerial vehicle equipment.

SUMMARY

This section provides a general summary of the disclosure, instead of a comprehensive disclosure of its full scope or all features.

The objective of the present disclosure is to provide electronic equipment in a wireless communication system, a wireless communication method performed by electronic equipment in a wireless communication system, and a computer-readable storage medium, to solve the problem of interference in a wireless communication system including unmanned aerial vehicle equipment.

According to an aspect of the present disclosure, electronic equipment in a wireless communication system is provided, including a processing circuit configured to generate resource configuration information according to an interference condition that user equipment (UE) is subjected to, a current altitude of the UE being higher than an altitude threshold; and transmit the resource configuration information to base station equipment of other cells than neighbor cells of a current serving cell of the UE, to be used by the base station equipment of the other cells to configure information transmitting resources.

According to another aspect of the present disclosure, electronic equipment in a wireless communication system is provided, including a processing circuit configured to generate resource configuration information according to an interference condition that the electronic equipment is subjected to; and transmit the resource configuration information to base station equipment of other cells than neighbor cells of a cell of the electronic equipment, to be used by the base station equipment of the other cells to configure for served user equipment (UE) information transmitting resources, a current altitude of the UE being higher than an altitude threshold.

According to another aspect of the present disclosure, a wireless communication method performed by electronic equipment in a wireless communication system is provided, including: generating resource configuration information according to an interference condition that user equipment (UE) is subjected to, a current altitude of the UE is higher than an altitude threshold; and transmitting the resource configuration information to base station equipment of other cells than neighbor cells of a current serving cell of the UE, to be used by the base station equipment of the other cells to configure information transmitting resources.

According to another aspect of the present disclosure, a wireless communication method performed by electronic equipment in a wireless communication system is provided, including: generating resource configuration information according to an interference condition that the electronic equipment is subjected to; and transmitting the resource configuration information to base station equipment of other cells than neighbor cells of a cell of the electronic equipment, to be used by the base station equipment of the other cells to configure for served user equipment (UE) information transmitting resources, a current altitude of the UE being higher than an altitude threshold.

According to another aspect of the present disclosure, a computer-readable storage medium is provided, including computer-executable instructions, which when executed by a computer, cause the computer to execute the wireless communication method according to the present disclosure.

By the electronic equipment in a wireless communication system, the wireless communication method performed by electronic equipment in a wireless communication system, and the computer-readable storage medium, in the case of downlink interference, the electronic equipment may generate resource configuration information according to the interference condition that the user equipment is subjected to, and may transmit the resource configuration information to base station equipment of other cells than neighbor cells of a current serving cell of the UE, to be used by the base station equipment of the other cells to configure information transmitting resources. In this way, the electronic equipment can coordinate information transmitting resources with the base station equipment of the other cells than the neighbor cells, to solve the interference problem in the case of downlink interference.

By the electronic equipment in a wireless communication system, the wireless communication method performed by electronic equipment in a wireless communication system, and the computer-readable storage medium, in the case of uplink interference, the electronic equipment may generate resource configuration information according to the interference condition that the electronic equipment is subjected to, and may transmit the resource configuration information to base station equipment of other cells than neighbor cells of a current serving cell, to be used by the base station equipment of the other cells to configure for served user equipment information transmitting resources. In this way, the electronic equipment can coordinate information transmitting resources with the base station equipment of the other cells than the neighbor cells, to solve the interference problem in the case of uplink interference.

Further applicability will become apparent from the description provided herein. The description and specific examples are provided only for illustration rather than limitation to the present disclosure.

BRIEF DESCRIPTION OF THE DRAWINGS

The drawings described herein are for illustrative purposes only instead of showing all possible implementations, and are not intended to limit the scope of the disclosure. In the drawings.

Figure 1:
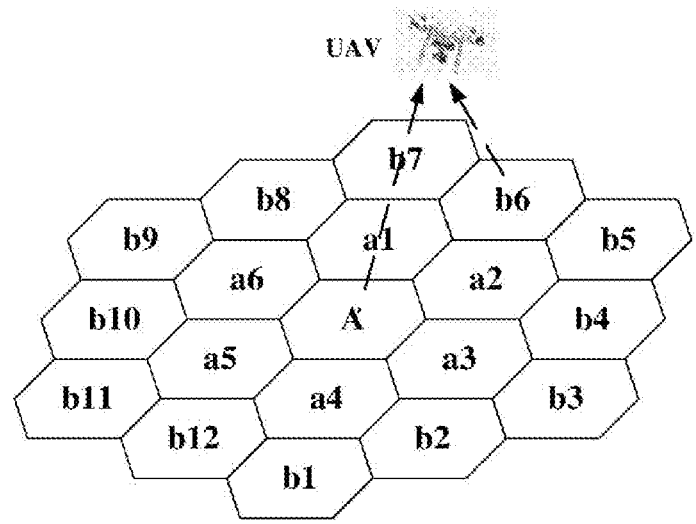
FIG. 1 is a schematic diagram showing a case of downlink interference according to an embodiment of the present disclosure.

While embodiments of the present disclosure may be modified and replaced in various manners, specific embodiments are illustrated in the drawings and are described in detail herein. It should be understood that the description of the specific embodiments are not intended to limit the invention to the specific form of the present disclosure, but intended to cover all modifications, equivalents, and replacements that fall within the spirit and scope of the disclosure. It is noted that throughout the several drawings, similar reference signs indicate similar parts.

DETAILED DESCRIPTION OF THE EMBODIMENTS

Examples in the present disclosure will be described more clearly with reference to the accompanying drawings. The description below is merely exemplary and is not intended to limit the application or use of the present disclosure.

The exemplary embodiments are illustrated to provide details in the present disclosure, so that those skilled in the art can fully understand the scope of the present disclosure. Numerous specific details, such as specific components, devices, and methods, are set forth to provide a thorough understanding of the embodiments of the present disclosure. It will be apparent to those skilled in the art that the example embodiments may be implemented in many different forms without some details, and the details should not be construed as limitation to the scope of the present disclosure. In some example embodiments, well-known processes, structures, and techniques are not described in detail.

The description includes the following sections:
1. Description of problem
2. Configuration example at a base station side in a case of downlink interference
3. Configuration example at a base station side in a case of uplink interference
4. Method embodiments
5. Application examples

1. DESCRIPTION OF PROBLEM

FIG. 1 is a schematic diagram showing a case of downlink interference according to an embodiment of the present disclosure. As shown in FIG. 1, in a wireless communication system, the one-hop neighbor cells of a cell A include: a1, a2, a3, a4, a5, and a6. Hereinafter, a one-hop neighbor cell of a cell A is also referred to as a neighbor cell of the cell A. In the present disclosure, the neighbor cell of the cell A refers to a one-hop neighbor cell of the cell A, that is, a cell at a location adjacent to the cell A. In FIG. 1, two-hop neighbor cells of the cell A include: b1, b2, b12. In the present disclosure, two-hop or more-hop neighbor cells of the cell A are referred to as cells other than the neighbor cell of cell A. In addition, the wireless communication system also includes unmanned aerial vehicle equipment UAV. Here, it is assumed that the current serving cell of the UAV is the cell A. When the altitude of the UAV reaches a certain threshold, the UAV is close to the base station of the cell b6 or have a good link to the base station of the cell b6, so that the UAV can receive downlink information from cell b6. In this case, the unmanned aerial vehicle equipment UAV can receive the downlink information from both the base station of the cell A and the base station of the cell b6. If the base station of the cell A and the base station of the cell b6 use the same resource to transmit the downlink information, the information from the base station of the cell A and the information from the base station of the cell b6 form interference information with each other, such that the unmanned aerial vehicle equipment cannot correctly demodulate information from either of the cell A and cell b6. It can be seen that in the case as shown in FIG. 1, the unmanned aerial vehicle equipment can receive downlink information from multiple base station equipment, and the multiple base station equipment use the same resources to transmit downlink information, which is called a case of downlink interference in the present disclosure.

It is noted that, only one unmanned aerial vehicle is shown in the wireless communication system in FIG. 1, but the present disclosure is not limited thereto, that is, multiple unmanned aerial vehicle equipment may be included in the wireless communication system. In the wireless communication system shown in FIG. 1, only one-hop neighbor cells and two-hop neighbor cells of the cell A are shown, but the cell A may also have neighbor cells of more than two hops. In addition, the number of base stations that cause interference to the unmanned aerial vehicles may be two or more, and the cells of the base stations may be one-hop neighbor cells, two-hop neighbor cells, or more-hop neighbor cells with each other. That is, the present disclosure is not limited to the case of downlink interference as shown in FIG. 1, but is applicable to all wireless communication systems in which unmanned aerial vehicle equipment is subject to downlink information interference from multiple base station equipment.

Figure 2:
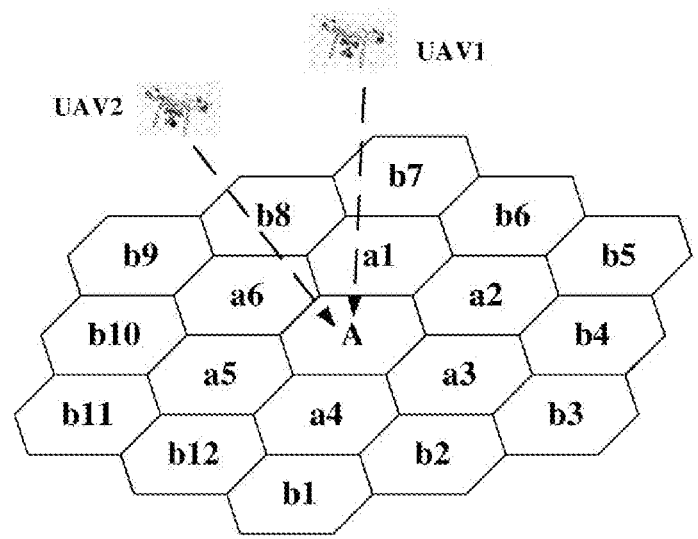
FIG. 2 is a schematic diagram showing a case of uplink interference according to an embodiment of the present disclosure.

FIG. 2 is a schematic diagram showing a case of uplink interference according to an embodiment of the present disclosure. The configuration of the cells shown in FIG. 2 is the same as that in FIG. 1, and details are not described herein. In addition, the wireless communication system includes unmanned aerial vehicle equipment UAV1 and UAV2. It is assumed that the current serving cell of the unmanned aerial vehicle equipment UAV1 is the cell b7, and the current serving cell of the unmanned aerial vehicle equipment UAV2 is the cell b9. When altitudes of the unmanned aerial vehicle equipment UAV1 and UAV2 reach a certain threshold, UAV1 and UAV2 are close to the base station of the cell A or have a good link to the base station of the cell A, so that the base station of the cell A can receive information from the unmanned aerial vehicle equipment UAV1 and UAV2. In this case, the base station of the cell A can receive uplink information from both the unmanned aerial vehicle equipment UAV1 and UAV2. If the unmanned aerial vehicle equipment UAV1 and UAV2 use the same resources to transmit the uplink information, the information from the unmanned aerial vehicle equipment UAV1 and the information from the unmanned aerial vehicle equipment UAV2 form interference information with each other, so that the base station of the cell A cannot correctly demodulate the information from either of UAV1 and UAV2. It can be seen that in the case shown in FIG. 2, the base station can receive uplink information from multiple unmanned aerial vehicle equipment, and the multiple unmanned aerial vehicle equipment use the same resources to transmit uplink information, which is called a case of uplink interference in the present disclosure.

It is noted that only two unmanned aerial vehicles are shown in the wireless communication system in FIG. 2, but the disclosure is not limited thereto, that is, more unmanned aerial vehicle equipment may be included in the wireless communication system. In the wireless communication system shown in FIG. 2, only one-hop neighbor cells and two-hop neighbor cells of the cell A are shown, but the cell A may also have neighbor cells of more than two hops. In addition, the number of unmanned aerial vehicles that cause interference to the base station may be two or more, and the unmanned aerial vehicle equipment may be in one-hop neighbor cells, two-hop neighbor cells, or more-hop neighbor cells of a cell of the base station. That is, the present disclosure is not limited to the case of uplink interference as shown in FIG. 2, but is applicable to all wireless communication systems in which base station equipment is subject to uplink information interference from multiple unmanned aerial vehicle equipment.

Further, in the present disclosure, the information causing the interference may include data information and control information. The control information may include a reference signal (RS). The reference signal herein includes, but is not limited to, SRS (Sounding Reference Signals), CRS (Cell-specific reference signals), and CSI-RS (Channel State Information Reference Signal).

Figure 3:
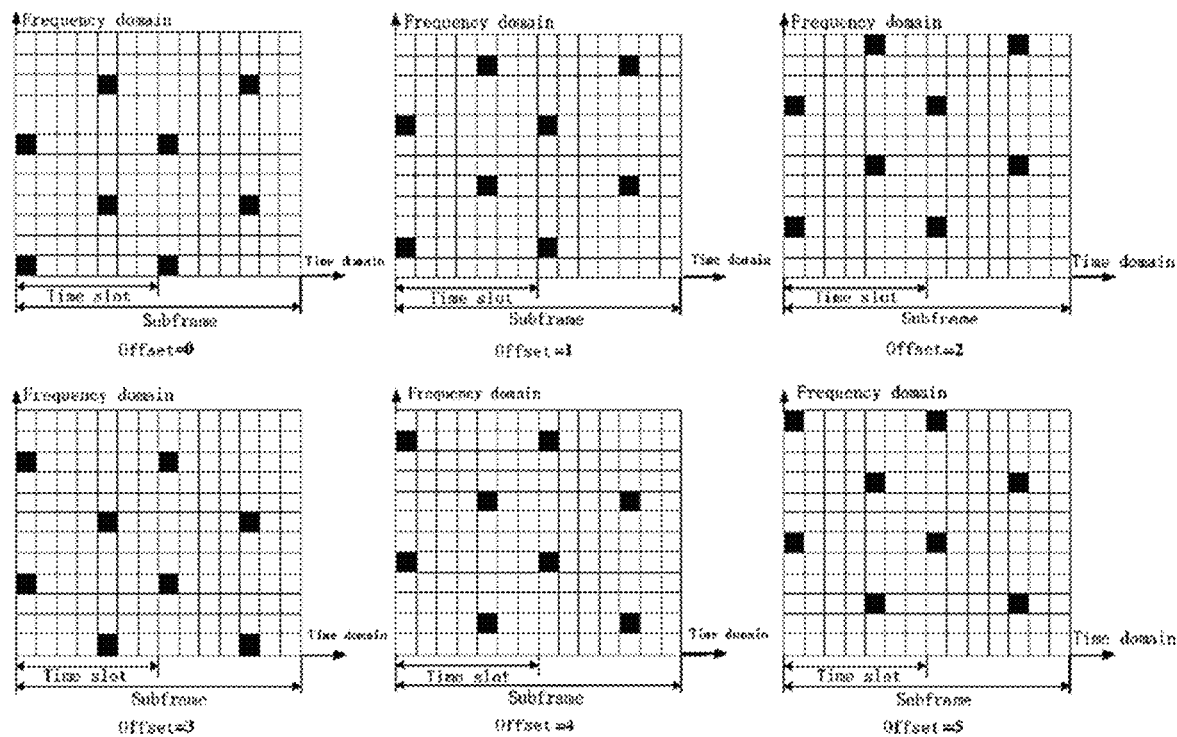
FIG. 3 is a schematic diagram showing resources for transmitting a reference signal according to an embodiment of the present disclosure.

FIG. 3 is a schematic diagram showing resources for transmitting a reference signal according to an embodiment of the present disclosure. Here, FIG. 3 only illustrates the configuration of the resource for transmitting information by taking the CRS as an example. FIG. 3 shows six resource configurations for transmitting CRS, namely, a configuration of "offset=0", a configuration of "offset=1", a configuration of "offset=2", a configuration of "offset=3", a configuration of "offset=4" and a configuration of "offset=5". The horizontal axis represents the time domain, the vertical axis represents the frequency domain, and each small square represents an RE (Resource Element). In each configuration, resource allocation of one subframe (14 OFDM symbols) in the time domain and 12 subcarriers (that is, spectrum resources occupied by one RB (Resource Block)) in the frequency domain is shown. Taking the configuration of "offset=0" as an example, each subframe includes two time slots, and CRS is transmitted on two subcarriers on the first and fourth OFDM symbols in each time slot (black squares show REs for transmitting CRSs). The configurations of other offsets are similar. As shown in FIG. 3, for different configurations, CRSs are transmitted on different subcarriers in the frequency domain, and in each time slot of each subframe in the time domain. Therefore, if multiple base stations transmit CRSs in the same configuration mode (for example, all in the configuration of "offset=0"), downlink interference will occur in unmanned aerial vehicle equipment when the unmanned aerial vehicle equipment can simultaneously receive signals from the multiple base stations.

As described above, FIG. 3 illustrates a resource allocation manner in which downlink interference is generated by transmitting control information, taking CRS as an example. Apparently, the principle for generating downlink interference by transmitting other control information and generating uplink interference by transmitting control information is similar. Further, the principle of generating downlink interference and uplink interference by transmitting data information is similar. That is, receiving downlink information from multiple base station equipment using the same resources may cause downlink interference at the unmanned aerial vehicle equipment, or receiving uplink information from multiple unmanned aerial vehicle equipment using the same resources may cause uplink interference at the base station. Resources herein may include spectrum resources.

Figure 4:
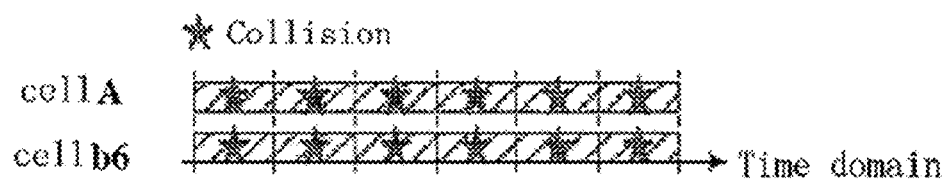
FIG. 4 is a schematic diagram showing information transmission causing uplink interference and downlink interference according to an embodiment of the present disclosure.
Figure 4:
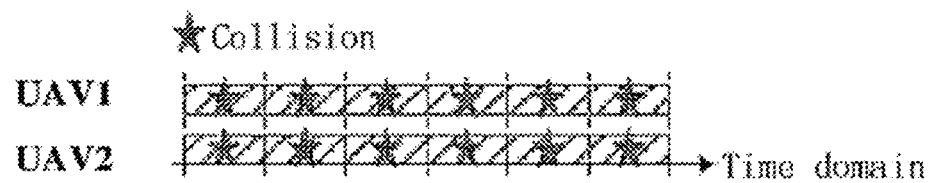

FIG. 4 is a schematic diagram showing information transmission causing uplink interference and downlink interference according to an embodiment of the present disclosure. The upper part of FIG. 4 is a schematic diagram of information transmission causing downlink interference, and the lower part of FIG. 4 is a schematic diagram of information transmission causing uplink interference. As shown in FIG. 4, when the base station of the cell A and the base station of the cell b6 use the same resources, for example, the same frequency resources, to transmit downlink information, since the base station of the cell A and the base station of the cell b6 will continuously transmit downlink information (for example, transmitting CRS in each time slot of each subframe), the UAV as described with reference to FIG. 1 simultaneously receives downlink information from the two base stations, and thus cannot correctly demodulate information from either of the two base stations. Similarly, as shown in FIG. 4, when UAV1 and UAV2 use the same resources, for example, the same frequency resources to transmit uplink information, since UAV1 and UAV2 continuously transmit uplink information, the base station of the cell A as described with reference to FIG. 2 can simultaneously receive uplink information from UAV1 and UAV2, and thus cannot correctly demodulate information from either of UAV1 and UAV2.

In the present disclosure, for the above cases, electronic equipment in a wireless communication system, a wireless communication method performed by electronic equipment in a wireless communication system, and a computer readable storage medium are provided to solve the interference problem in the wireless communication system including unmanned aerial vehicle equipment.

2. CONFIGURATION EXAMPLE AT A BASE STATION SIDE IN A CASE OF DOWNLINK INTERFERENCE

Figure 5:
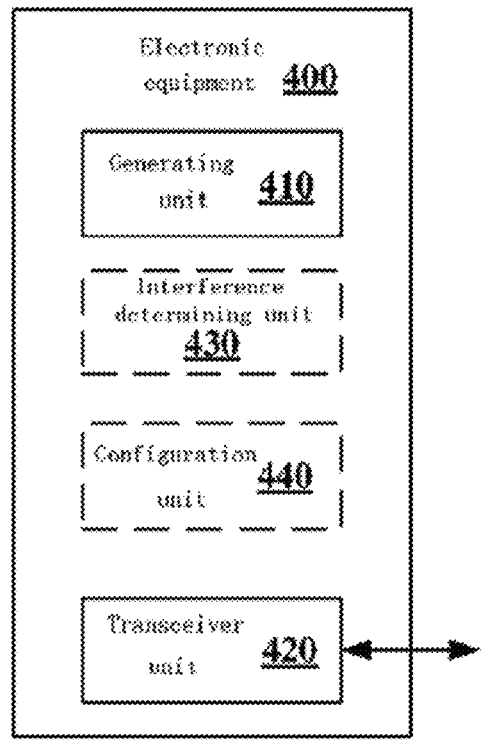
FIG. 5 is a schematic structural diagram of electronic equipment according to an embodiment of the present disclosure.

FIG. 5 is a schematic structural diagram of electronic equipment 400 according to an embodiment of the present disclosure. The electronic equipment 400 may be base station equipment in a wireless communication system. The wireless communication system may include multiple base station equipment and one or more unmanned aerial vehicle equipment. As shown in FIG. 5, the electronic equipment 400 may include a generating unit 410 and a transceiver unit 420.

Various units of the electronic equipment 400 may be included in a processing circuit. It should be noted that the electronic equipment 400 may include one processing circuit or multiple processing circuits. Further, the processing circuit may include various separated functional units to perform various different functions and/or operations. It should be noted that these functional units may be physical entities or logical entities, and units of different names may be implemented by a same physical entity.

According to an embodiment of the present disclosure, the generating unit 410 may generate resource configuration information according to an interference condition that user equipment is subjected to, and a current altitude of the user equipment is higher than an altitude threshold.

According to an embodiment of the present disclosure, the electronic equipment 400 may be base station equipment of a current serving cell of the user equipment, and the user equipment may be unmanned aerial vehicle equipment. As mentioned above, when the flight altitude of the UAV equipment is low (relative to the base station), the UAV equipment can be regarded as general UE. When the flight altitude of the UAV equipment is high (for example, higher than the base station), the UAV equipment cannot be regarded as general UE because of the low attenuation of electromagnetic signals at high altitude. Thus, in the present disclosure, the altitude threshold may be a threshold used to determine whether the unmanned aerial vehicle equipment can be regarded as general UE. That is, when the current altitude of the user equipment is higher than the altitude threshold, the user equipment cannot be regarded as general UE.

According to an embodiment of the present disclosure, the transceiver unit 420 may transmit the resource configuration information to base station equipment of other cells than neighbor cells of a current serving cell of the user equipment, to be used by the base station equipment of the other cells to configure information transmitting resources.

According to an embodiment of the present disclosure, the current serving cell of the user equipment may be a cell of the electronic equipment 400 as base station equipment. The neighbor cell of the current serving cell refers to a one-hop neighbor cell of the current serving cell, that is, a cell that is adjacent to the current serving cell in geographical location. That is, the other cells than the neighbor cells of the current serving cell are two-hop neighbor cells or more-hop neighbor cells of the current serving cell. According to an embodiment of the present disclosure, the transceiver unit 420 may transmit to the other cells resource configuration information, to be used by the based station of the other cells to configure information transmitting resources.

It can be seen that, according to an embodiment of the present disclosure, the electronic equipment may transmit resource configuration information to base station equipment of the other cells than the neighbor cells. For a general UE, when it is located at an edge of a cell, the UE may receive downlink signals from two base stations. That is, the base station causing interference to the UE is a base station of a neighbor cell. Therefore, in the conventional interference coordination scheme, the base station equipment can only transmit information for coordinating resources to the base station equipment of the neighbor cell. In the embodiment of the present disclosure, the base station equipment may send resource configuration information for coordinating resources to the base station equipment of cells other than the neighbor cells, so that the downlink interference problem in the wireless communication system including a UAV can be solved.

According to an embodiment of the present disclosure, the electronic equipment 400 may further include an interference determining unit 430. The interference determining unit 430 may determine the interference condition that the UE is subjected to according to information transmitting resources of the electronic equipment, information transmitting resources of base station equipment of the neighbor cells, and information transmitting resources of the base station equipment of the other cells.

According to an embodiment of the present disclosure, the information transmitted by the electronic equipment 400, the information transmitted by the base station equipment of the neighbor cells, and the information transmitted by the base station equipment of the other cells may include data information and control information. The control information may include a reference signal. That is, when the electronic equipment 400 is to determine the interference condition that the user equipment is subjected to with respect to data information, the electronic equipment 400 may determine the interference condition according to the resources used to transmit data information by the electronic equipment 400, the base station equipment of the neighbor cells, and the base station equipment of the other cells. When the electronic equipment 400 is to determine the interference condition that the user equipment is subjected to with respect to control information, the electronic equipment 400 may determine the interference condition according to the resources used to send control information by the electronic equipment 400, the base station equipment of the neighbor cells, and the base station equipment of the other cells.

According to an embodiment of the present disclosure, when information transmitting resources used by the electronic equipment 400, the base station equipment of the neighbor cells, and the base station equipment of the other cells are overlapping, the interference determining unit 430 may determine the user equipment is interfered. Here, the information transmitting resources may include spectrum resources for transmitting information. As described in the foregoing, when the spectrum resources used by multiple base station equipment for transmitting information are the same, the interference determining unit 430 may determine that the user equipment is interfered. For example, in the example as shown in FIG. 3, when multiple base station equipment use a configuration of "offset=0" to transmit CRSs, the spectrum resources used by the base station equipment to transmit CRSs are the same, and thus the interference determining unit 430 determines that the user equipment is interfered with respect to the control information CRS.

According to an embodiment of the present disclosure, the electronic equipment 400 may know information transmitting resources of the electronic equipment 400. That is, the interference determining unit 430 of the electronic equipment 400 needs to acquire the information transmitting resources of the base station equipment of the neighbor cells and information transmitting resources of the base station equipment of the other cells. The methods used by the electronic equipment 400 to acquire information transmitting resources of base station equipment of neighbor cells and base station equipment of other cells will be described below.

According to an embodiment of the present disclosure, the electronic equipment 400 may acquire, via an X2 interface, the information transmitting resources of the base station equipment of the neighbor cells and the base station equipment of the other cells. Each of the electronic equipment 400, the base station equipment of the neighbor cells, and the base station equipment of the other cells may send information to a neighbor cell of the cell of the equipment via the X2 interface, to notify of information transmitting resources of all base station equipment known by the equipment. That is, each of the above equipment transmits, each time when learning information transmitting resources of new equipment, information to the neighbor cell of the cell of the equipment via the X2 interface, to inform the neighbor cell of the learned information transmitting resources of the new equipment.

Figure 6:
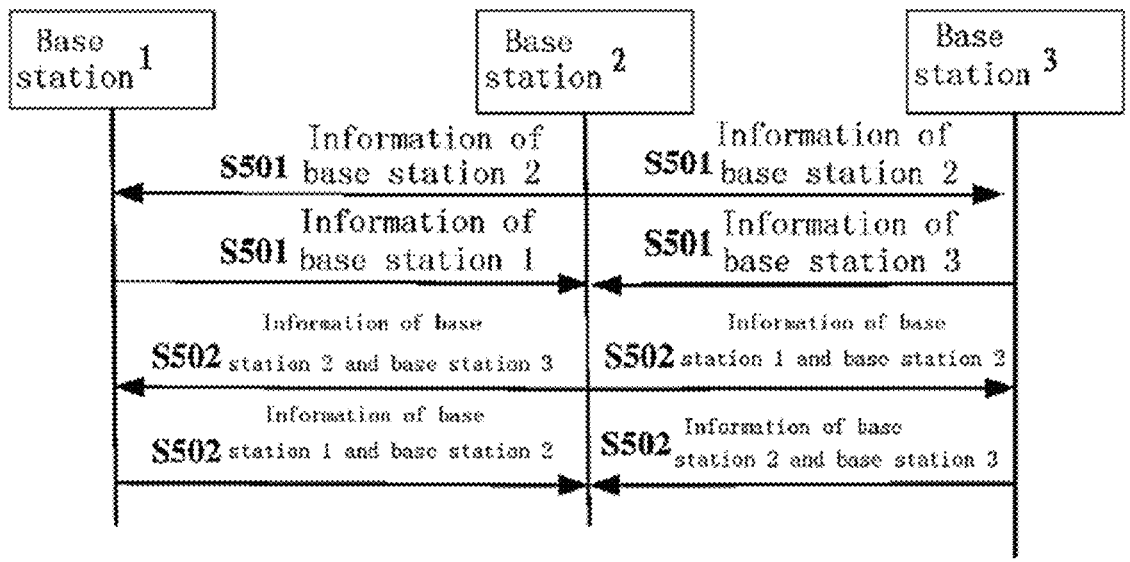
FIG. 6 is a signaling flowchart of a process for acquiring via an X2 interface the information transmitting resources of base station equipment according to an embodiment of the present disclosure.

FIG. 6 is a signaling flowchart of a process for acquiring via an X2 interface the information transmitting resources of all base station equipment according to an embodiment of the present disclosure. As shown in FIG. 6, the base station 1, the base station 2, and the base station 3 are all base station equipment in the wireless communication system. The cell of the base station 1 and the cell of the base station 2 are neighbor cells, and the cell of the base station 2 and the cell of the base station 3 are neighbor cells, but the cell of the base station 1 and the cell of the base station 3 are not neighbor cells. In step S501, each of the base station 1, the base station 2, and the base station 3 transmits respective used information transmitting resources to neighbor cells of the cell of the base station via the X2 interface. That is, the base station 2 transmits the information transmitting resources of the base station 2 to the base station 1 and the base station 3, the base station 1 transmits the information transmitting resources of the base station 1 to the base station 2, and the base station 3 transmits the information transmitting resources of the base station 3 to the base station 2. Next, in step S502, since the base station 1, the base station 2, and the base station 3 all receive information transmitting resources from other base stations, each base station transmits the learned information transmitting resources of all equipment to the neighbor cells of the cell of the base station via the X2 interface. That is, the base station 1 transmits to the base station 2 information transmitting resources of the base station 1 and the base station 2, the base station 2 transmits to the base station 1 information transmitting resources of the base station 2 and the base station 3, the base station 2 transmits to the base station 3 information transmitting resources of the base station 1 and the base station 2, and the base station 3 transmits to the base station 2 information transmitting resources of the base station 2 and the base station 3. As shown in FIG. 6, in this manner, the base station 1 can learn the information transmitting resources used by the base station 2 and the base station 3, the base station 2 can learn the information transmitting resources used by the base station 1 and the base station 3, and the base station 3 can learn the information transmitting resources used by the base station 1 and the base station 2.

It can be seen that, according to the embodiment of the present disclosure, since the X2 interface can only be used to transmit information between the base stations of the neighbor cells, any one of the base stations in the wireless communication system can learn the information transmitting resources of all base stations in the wireless communication system by means of multiple transmissions.

According to an embodiment of the present disclosure, the electronic equipment 400 may further acquire, via an S1 interface, the information transmitting resources of the base station equipment of the neighbor cells and the base station equipment of the other cells. The electronic equipment 400 may acquire, via the S1 interface from the MME (Mobility Management Entity) in the core network, information transmitting resources of the base station equipment of the neighbor cells and the base station equipment of the other cell. According to an embodiment of the present disclosure, the electronic equipment 400 may report the information transmitting resources of the electronic equipment 400 to the MME through the S1 interface. This report may be performed periodically or triggered by an event. In this way, all the base station equipment in the wireless communication system report the information transmitting resources to the MME via the S1 interface. When the electronic equipment 400 needs to acquire the information transmitting resources of all base station equipment, the electronic equipment 400 can obtains the information from the MME via the S1 interface.

It can be seen that, according to an embodiment of the present disclosure, the base station can directly obtain information from the MME via the S1 interface, so that the obtaining step is simple and easy, thereby saving time and signaling overhead.

According to an embodiment of the present disclosure, the process in which the electronic equipment 400 acquires information transmitting resources of base station equipment of neighbor cells and base station equipment of other cells via an X2 interface or an S1 interface may be periodically triggered. That is, at a certain time interval, the electronic equipment 400 periodically acquires information transmitting resources of the base station equipment of the neighbor cells and the base station equipment of the other cells through the X2 interface or the S1 interface. The electronic equipment 400 may use the latest acquired information for determining the interference condition that the user equipment is subjected to.

In addition, regarding the control information, the resource used by the base station to transmit control information may correspond to one or more parameters of the base station. For example, the resources used by the base station to transmit the CRS correspond to the PCI (Physical Cell Identifier) of the base station. In this case, the electronic equipment 400 may acquire the information transmitting resources of the base station equipment of the neighbor cells and the base station equipment of the other cells by using the parameters of the base station equipment of the neighbor cells and the base station equipment of the other cells. The parameters of the base station equipment of the neighbor cells and the base station equipment of the other cells may be stored in the electronic equipment 400 in advance, or may be directly acquired by the electronic equipment 400 from the MME via the S1 interface, without updating.

According to an embodiment of the present disclosure, the information transmitting resources may be in various forms, such as numbers of spectrum resources for transmitting information (the number and the spectrum resources are in a one-to-one correspondence). Resources for transmitting control information only have a few fixed configurations. Therefore, the resource for transmitting the control information may also be represented by the configured number. In the example shown in FIG. 3, resources for transmitting CRS may be represented by numbers 0-5. For example, when the base station equipment represents the resource for transmitting the CRS by using the number 0, the electronic equipment 400 may determine that the base station equipment transmits the CRS by using the configuration of the "offset=0", so as to determine the resources used by the base station equipment for transmitting the CRS. In addition, in a case where the resource used by the base station equipment to transmit the control information corresponds to one or more parameters of the base station equipment, the resource for transmitting control information may also be represented by a parameter of the base station equipment. For example, if the electronic equipment 400 knows the PCI of the base station equipment, the resource used by the base station equipment to transmit control information may be determined according to the PCI.

It can be seen that, according to an embodiment of the present disclosure, the interference determining unit 430 may determine the resources for transmitting control information by the electronic equipment, the base station equipment of the neighbor cells, and the base station equipment of the other cells according to the PCIs of the electronic equipment, the base station equipment of the neighbor cells, and the base station equipment of the other cells.

As described above, according to an embodiment of the present disclosure, the electronic equipment 400 may determine, by various methods, information transmitting resources of the electronic equipment 400, information transmitting resources of the base station equipment of the neighbor cells, and information transmitting resources of the base station equipment of the other cells, thereby determining whether the user equipment in the coverage of the electronic equipment 400 is interfered.

According to an embodiment of the present disclosure, the interference determining unit 430 may further determine the interference condition that the user equipment is subjected to according to the location information of the user equipment.

According to an embodiment of the present disclosure, the user equipment in the coverage of the electronic equipment 400 can periodically report its own location, so that the electronic equipment 400 can acquire location information of all user equipment in its coverage.

According to an embodiment of the present disclosure, the user equipment can receive signals of only a part of the base station equipment in the wireless communication system. For example, the user equipment can receive a signal of base station equipment close to it, or the user equipment can receive a signal of base station equipment having a good link to the user equipment. Therefore, the electronic equipment 400 may also consider the location information of the user equipment when determining whether the user equipment is interfered.

According to an embodiment of the present disclosure, the interference determining unit 430 may determine the interference condition that the user equipment is subjected to, according to the information transmitting resources of equipment among the electronic equipment, the base station equipment of the neighbor cells and the base station equipment of the other cells, whose distance from the user equipment is less than a distance threshold.

According to an embodiment of the present disclosure, the interference determining unit 430 may further consider both location information of the user equipment and link quality between the user equipment and the base station equipment, to select a part of base station equipment from the electronic equipment 400, the base station equipment of the neighbor cells, and the base station of the other cells, and determine the interference condition that the user equipment is subjected to according to the information transmitting resources of the part of base station equipment. In this case, the part of the base station equipment is selected according to a rule that a downlink signal sent by the selected base station equipment can reach the user equipment, that is, the part of the base station equipment is a potential interference source of the user equipment.

It can be seen that, according to an embodiment of the present disclosure, when determining the interference condition that the user equipment is subjected to, the electronic equipment 400 may consider only a part of base station equipment, which can simplify the process, reduce signaling overhead, and avoid unnecessary impact on base stations.

According to an embodiment of the present disclosure, the interference determining unit 430 may group the electronic equipment 400, the base station equipment of the neighbor cells and the base station equipment of other cells, according to the information transmitting resources of the electronic equipment 400, the base station equipment of the neighbor cells, and the base station equipment of the other cells.

If the interference determining unit 430 does not select a part of base station equipment from all the base station equipment of the wireless communication system for determining the interference condition that the user equipment is subjected to, the interference determining unit 430 may group the electronic equipment 400, the base station of the neighbor cells and the base station equipment of the other cells according to the information transmitting resources of the electronic equipment 400, the base station equipment of the neighbor cells, and the base station equipment of the other cells (that is, all the base station equipment in the wireless communication system). If the interference determining unit 430 selects a part of base station equipment from all the base station equipment in the wireless communication system for determining the interference condition that the user equipment is subjected to, the interference determining unit 430 may group the part of base station equipment according to the information transmitting resources of the part of base station equipment.

According to an embodiment of the present disclosure, the interference determining unit 430 may group the above equipment such that the information transmitting resources of equipment in the same group are the same. Resources herein may include spectrum resources.

Taking the case shown in FIG. 1 as an example, it is assumed that the interference determining unit 430 determines the base station equipment of the cells A, a1, a2, b6, and b7 as potential base stations interfering the unmanned aerial vehicle equipment UAV according to the geographic location of the unmanned aerial vehicle equipment UAV. That is, the base station equipment of these cells is close to the unmanned aerial vehicle equipment UAV or has good link quality to the unmanned aerial vehicle equipment UAV. In this case, the interference determining unit 430 may group the five cells. It is assumed that the base station equipment of the cell A transmits information using the spectrum resource numbered 1, the base station equipment of the cell a1 transmits information using the spectrum resource numbered 2, the base station equipment of the cell a2 transmits information using the spectrum resource numbered 3, the base station equipment of the cell b6 transmits information using the spectrum resource numbered 1, and the base station equipment of the cell b7 transmits information using the spectrum resource numbered 3. Therefore, the interference determining unit 430 may group the base station equipment of the five cells as follows:

First group (using the spectrum resource numbered 1): the base station equipment of the cell A; the base station equipment of the cell b6;

Second group (using the spectrum resource numbered 2): the base station equipment of the cell a1;

Third group (using the spectrum resource numbered 3): the base station equipment of cell a2; the base station equipment of cell b7.

According to an embodiment of the present disclosure, the interference determining unit 430 may determine the interference condition that the user equipment is subjected to according to the grouping result. Specifically, if any group includes multiple base station equipment, the interference determining unit 430 may determine that the user equipment is interfered. If each group includes only one base station equipment, the interference determining unit 430 may determine that the user equipment is not interfered.

According to an embodiment of the present disclosure, when determining that the user equipment is interfered, the generating unit 410 may generate resource configuration information, and the transceiver unit 420 may transmit the resource configuration information to the base station equipment of the neighbor cells and the base station equipment of the other cells than the neighbor cells. Specifically, the transceiver unit 430 may send the resource configuration information to the base station equipment that is in a group including more than one base station equipment. In the example described above, the first group and the third group include multiple base stations, and thus the electronic equipment 400 may transmit the resource configuration information to the base station equipment of the cell b6, the base station equipment of the cell a2, and the base station equipment of the cell b7.

As described above, according to an embodiment of the present disclosure, when a group includes multiple base station equipment, it is indicated that the multiple base station equipment use the same resource to transmit downlink information, and the user equipment may receive the downstream information from the multiple base station equipment, causing interference. In this case, the electronic equipment 400 may generate resource configuration information for the respective base station equipment and transmit to the respective base station equipment to coordinate the resources for transmitting the downlink information, thereby solving the interference problem. In addition, the other base station equipment (the base station equipment of the cell b6) and the base station equipment of the current serving cell of the user equipment (the base station equipment of the cell A) are most likely to cause interference to the user equipment. In the existing cellular network, the interference between neighbor cells can be avoided. Therefore, in general, the base station equipment that uses the same resource as the base station equipment of the current serving cell is base station equipment of a cell other than the neighbor cell. Therefore, according to an embodiment of the present disclosure, the electronic equipment 400 may transmit resource configuration information only to base station equipment of other cells than the neighbor cells. In some cases, base station equipment of multiple cells other than the current serving cell may cause interference to the user equipment (for example, the base station equipment of the cell a2 and the base station equipment of the cell b7). These cells other than the current serving cell are likely neighbor cells of the current serving cell. Therefore, the electronic equipment 400 may transmit resource configuration information to the base station equipment of the neighbor cells.

According to an embodiment of the present disclosure, the electronic equipment 400 may transmit the resource configuration information via an X2 interface or an S1 interface. For example, the electronic equipment 400 may transmit the resource configuration information to the MME via the S1 interface, so that other base station equipment may obtain respective resource configuration information from the MME via the S1 interface. Apparently, if the base station equipment receiving the resource configuration information is the base station equipment of a neighbor cell of the cell of the electronic equipment 400, the electronic equipment 400 may also transmit the resource configuration information via the X2 interface, which is not limited in this disclosure.

According to an embodiment of the present disclosure, the generating unit 410 may generate the resource configuration information such that equipment in the same group can perform multiplexing on the information transmitting resources.

According to an embodiment of the present disclosure, if a group includes multiple equipment, it indicates that the multiple equipment transmit information using the same resources. Therefore, it is required that the multiple equipment perform multiplexing on the same resources to solve the interference problem. If a group includes only one equipment, since there is only one entity for multiplexing, the equipment may continue to use the original resource to transmit information in the original manner. That is, no resource configuration information needs to be generated for the equipment.

According to an embodiment of the present disclosure, the multiplexing may include time division multiplexing, frequency division multiplexing, and space division multiplexing. The three multiplexing methods are described in detail below.

When the multiple equipment in the same group perform time-multiplexing on the information transmitting resources, the multiple equipment may periodically use the information transmitting resources so as to use the resources at different times. The generating unit 410 may generate resource configuration information including, for example, parameters of a period of using the resources and a starting time.

Figure 7:
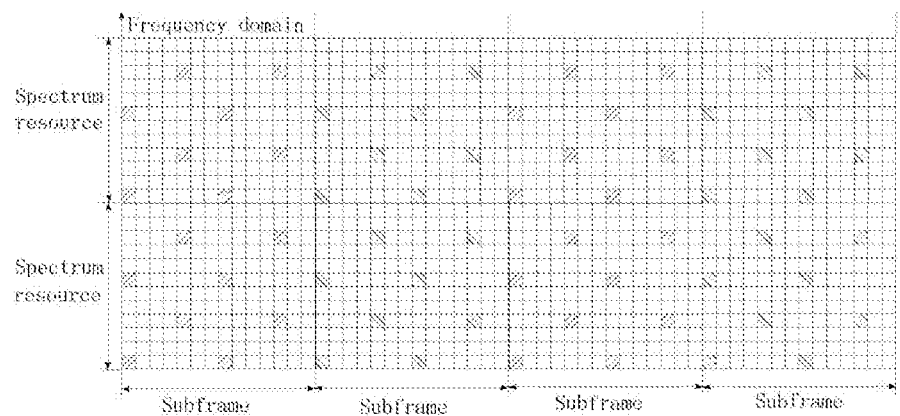
FIG. 7 is a schematic diagram showing time division multiplexing performed on the information transmitting resources of base station equipment in a same group according to an embodiment of the present disclosure.

FIG. 7 is a schematic diagram showing time division multiplexing performed on the information transmitting resources of base station equipment in a same group according to an embodiment of the present disclosure. A schematic diagram of time division multiplexing performed on resources for transmitting CRC by two base stations is shown in FIG. 7 as an example. FIG. 7 shows the use of resources of four subframes in the time domain and 24 subcarriers (i.e., the spectrum occupied by two RBs) in the frequency domain. It is assumed here that both base station equipment use the configuration of "offset=0" to transmit the CRS. After the time division multiplexing is performed, the squares filled with the stripes tilted to the left represents the REs used by the first base station equipment to transmit the CRS, and the squares filled with the stripes tilted to the right represents the REs used by the second base station equipment to transmit the CRS. It can be seen that both base station equipment transmit CRSs in a period of two subframes, and the starting times of the two base stations are different. The first base station equipment transmits CRC starting from the first subframe at a period of two subframes, and the second base station equipment transmits CRS starting from the second subframe at a period of two subframes. In the frequency domain, the two base stations use the same spectrum resources to transmit CRS. In this way, the time that the two base stations transmit the CRS is different, so that the user equipment does not receive the CRSs from the two base stations at the same time, thereby avoiding interference.

It is noted that FIG. 7 only shows the case where two base stations transmit CRS. For the cases of transmission of control information other than the CRS, the transmission of the data information, and the transmission by more base station equipment, the processes are similar, which are not repeated herein.

When multiple equipment in a same group perform frequency-multiplexing on the information transmitting resources, the multiple equipment can use the information transmitting resources by using different spectrum resources. The generating unit 410 may generate resource configuration information including, for example, a number of a spectrum resource.

Figure 8:
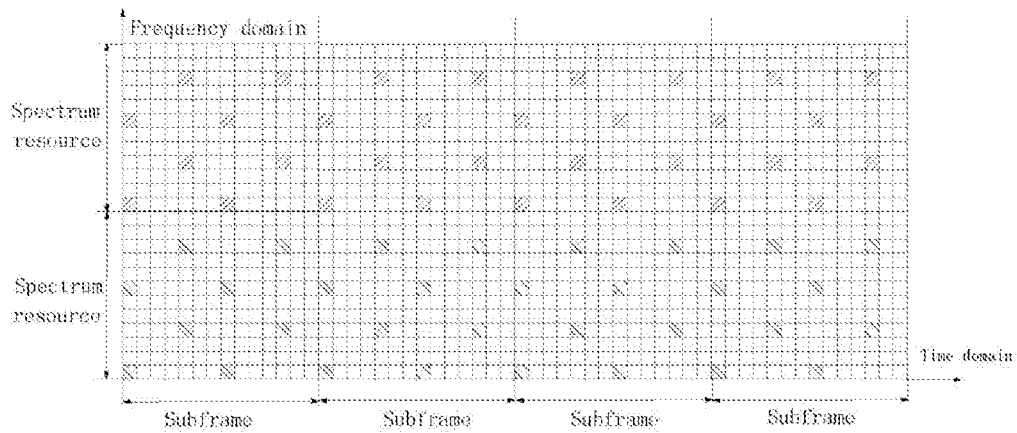
FIG. 8 is a schematic diagram showing frequency division multiplexing performed on the information transmitting resources of base station equipment in a same group according to an embodiment of the present disclosure.

FIG. 8 is a schematic diagram showing frequency division multiplexing performed on the information transmitting resources of base station equipment in a same group according to an embodiment of the present disclosure. A schematic diagram of frequency division multiplexing on resources for transmitting CRC by two base stations is shown in FIG. 8 as an example. FIG. 8 shows the use of resources of four subframes in the time domain and 24 subcarriers (i.e., the spectrum occupied by two RBs) in the frequency domain. It is assumed here that both base station equipment use the configuration of "offset=0" to transmit the CRS. After the frequency division multiplexing is performed, the squares filled with the stripes tilted to the left represents the REs used by the first base station equipment to transmit CRS, and the squares filled with the stripes tilted to the right represents the REs used by the second base station equipment to transmit CRS. It can be seen that the two base stations use different spectrum resources. The first base station equipment uses the spectrum resources shown in the upper part of FIG. 8, and the second base station equipment uses the spectrum resources shown in the lower part of FIG. 8. In the time domain, the two base stations use the same time-domain resources, that is, they transmit CRS in each time slot of each subframe. In this way, the two base stations use different frequency-domain resources to transmit CRS, so that the user equipment does not receive the CRSs from the two base stations at the same spectrum resource, thereby avoiding interference.

It should be noted that FIG. 8 only shows the case where two base stations transmit CRS. For the cases of transmission of control information other than the CRS, the transmission of the data information, and the transmission by more base station equipment, the processes are similar, which are not repeated herein.

When multiple equipment in the same group performs space division multiplexing on the information transmitting resources, the multiple equipment can transmit the information transmitting resources by using beams of different directions, so that different equipment transmit information by different beams. The generating unit 410 may generate resource configuration information including a beam number and a direction, for example.

Figure 9:
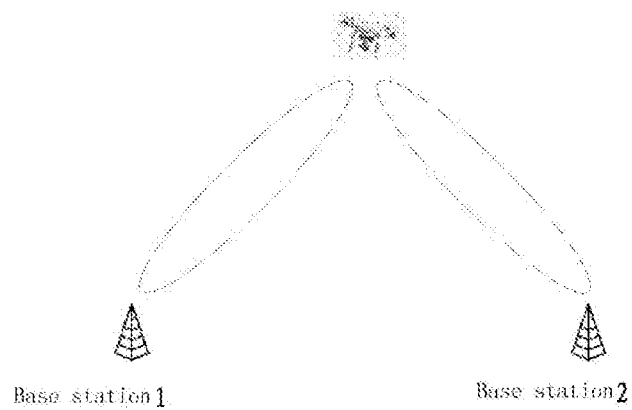
FIG. 9 is a schematic diagram showing space division multiplexing performed on the information transmitting resources of base station equipment in a same group according to an embodiment of the present disclosure.

FIG. 9 is a schematic diagram showing space division multiplexing performed on the information transmitting resources of base station equipment in a same group according to an embodiment of the present disclosure. As shown in FIG. 9, it is assumed that both the base station 1 and the base station 2 use the same resources to transmit downlink information to the unmanned aerial vehicle equipment. After performing space division multiplexing, the two base stations perform beam-forming on the downlink information to transmit information using beams in different directions. In this case, the two base stations use the same resources in the frequency domain, and use the resources in all time in the time domain. In this way, the user equipment can determine the transmitting base station equipment according to the beam direction when receiving the downlink information, thereby avoiding interference.

Various embodiments for performing multiplexing by base station equipment in the same group are detailed as above. Apparently, in the present disclosure, the multiplexing is not limited to time division multiplexing, frequency division multiplexing, and space division multiplexing, as long as the resources for transmitting information can be multiplexed so that the user equipment can correctly receive the information without interference.

According to an embodiment of the present disclosure, in the case of control information, the generating unit 410 may further generate the resource configuration information according to whether the base station equipment of the neighbor cells and the base station equipment of the other cells than the neighbor cell serve other unmanned aerial vehicle equipment. Specifically, in a case that a group includes multiple equipment and one or more of the multiple equipment do not provide services for any unmanned aerial vehicle equipment, the generating unit 410 may generate resource configuration information for the one or more equipment, such that the one or more equipment do not send any control information, such as a reference signal. For example, the resource configuration information generated for the one or more equipment may include signaling instructing not to transmit control information. Further, the generating unit 410 may generate resource configuration information for equipment other than the one or more equipment in the group, such that equipment other than the one or more equipment in the group performs multiplexing on the information transmitting resources.

In the example described in the foregoing, assuming that in the first group (using the spectrum resource numbered 1), the base station equipment of the cell b6 does not serve any unmanned aerial vehicle equipment, the generating unit 410 may generate resource configuration information for the base station equipment of the cell b6 such that the base station equipment of the cell b6 does not transmit any control information but the base station equipment of the cell A can continue to use the spectrum resource numbered 1. In this case, if the group includes multiple equipment in addition to the base station equipment of the cell b6, the multiple equipment may perform multiplexing on the spectrum resources numbered 1 according to various embodiments of the present disclosure.

As described above, according to an embodiment of the present disclosure, when base station equipment does not provide a service to any unmanned aerial vehicle equipment, resource configuration information may be generated to "turn off" the base station equipment, thereby reducing the number of base station equipment performing the multiplexing, thereby improving the effect of multiplexing while avoiding interference.

Figure 10:
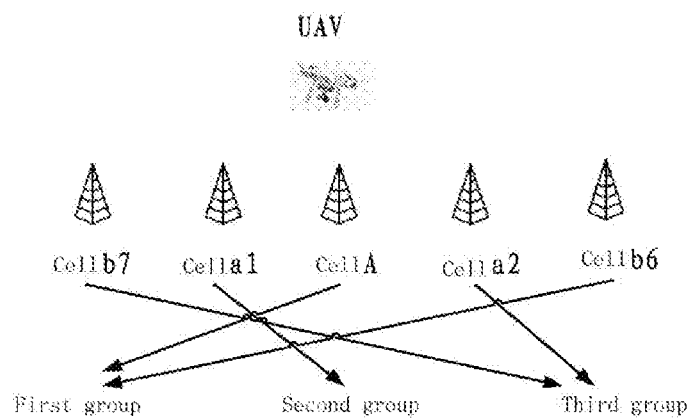
FIG. 10 is schematic diagram of grouping the base station equipment according to an embodiment of the present disclosure.

The resource multiplexing method described in the foregoing will be described below with an example. FIG. 10 is a schematic diagram of grouping the base station equipment according to an embodiment of the present disclosure. As shown in FIG. 10, the base station equipment of the cells A, a1, a2, b6, and b7 are potential interfering base stations of the unmanned aerial vehicle equipment UAV. The interference determining unit 430 may group the five cells as follows:

First group (using spectrum resource numbered 1): base station equipment of cell A, and base station equipment of cell b6;

Second group (using spectrum resource numbered 2): base station equipment of cell a1; and Third group (use number a spectrum resource of 3): base station equipment of cell a2, and base station equipment of cell b7.

Figure 11:
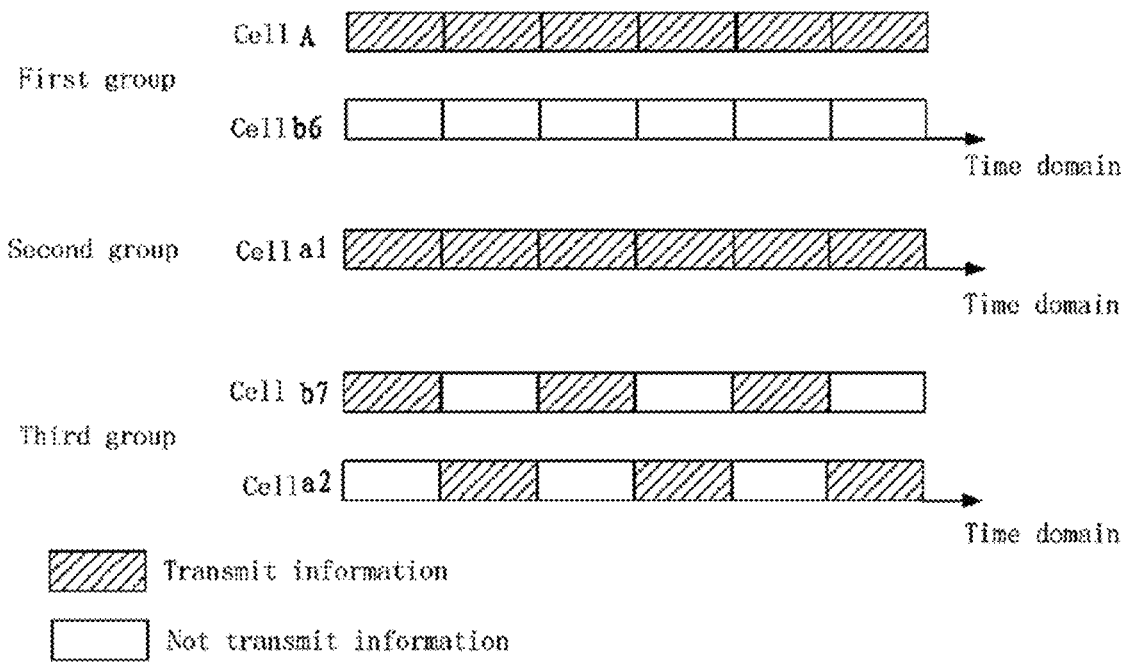
FIG. 11 is a schematic diagram showing time division multiplexing performed on the information transmitting resources of each group of base station equipment according to an embodiment of the present disclosure.

FIG. 11 is a schematic diagram showing time division multiplexing performed on information transmitting resources of each group of base station equipment in FIG. 10, according to an embodiment of the present disclosure. As shown in FIG. 11, in the first group, assuming that the base station equipment of the cell b6 does not provide service to any unmanned aerial vehicle equipment, the generating unit 410 may generate resource configuration information for the base station equipment of the cell b6 such that the base station equipment of the cell b6 does not transmit any control information but the base station equipment of cell A can continue to use the spectrum resource numbered 1. That is, the base station equipment of the cell A can always transmit information using the spectrum resource numbered 1, and the base station equipment of the cell b6 cannot transmit information using the spectrum resource numbered 1, that is, in an "off" state. In the second group, since there is base station equipment of only one cell, the base station equipment of the cell a1 can always transmit information using the spectrum resource numbered 2. In the third group, the base station equipment of the cell a2 and the base station equipment of the cell b7 perform time division multiplexing on the spectrum resource numbered 3, that is, periodically in an "off" state. As shown in FIG. 11, the base station equipment of the cell a2 and the base station equipment of the cell b7 can periodically transmit information using the spectrum resource numbered 3 at alternate times. As described above, according to the multiplexing mode shown in FIG. 11, the potential interfering base station of the unmanned aerial vehicle equipment UAV in FIG. 10 does not cause downlink interference to the unmanned aerial vehicle equipment UAV. It is noted that FIG. 11 only shows the mode of time division multiplexing, which is similar to other modes of multiplexing.

According to an embodiment of the present disclosure, the electronic equipment 400 may further include a configuration unit 440. When the generating unit 410 generates the resource configuration information for the electronic equipment 400, the generating unit 410 may transmit the resource configuration information for the electronic equipment 400 to the configuration unit 440, so that the configuration unit 440 may configure information transmitting resources of the electronic equipment 400 according to the resource configuration information.

According to an embodiment of the present disclosure, the transceiver unit 420 of the electronic equipment 400 may further transmit all resource configuration information generated by the generating unit 410 to the user equipment, so that the user equipment can learn the resource configuration situation of all or part of the base station equipment, to facilitate information detection and handover between cells, or the like.

Figure 12:
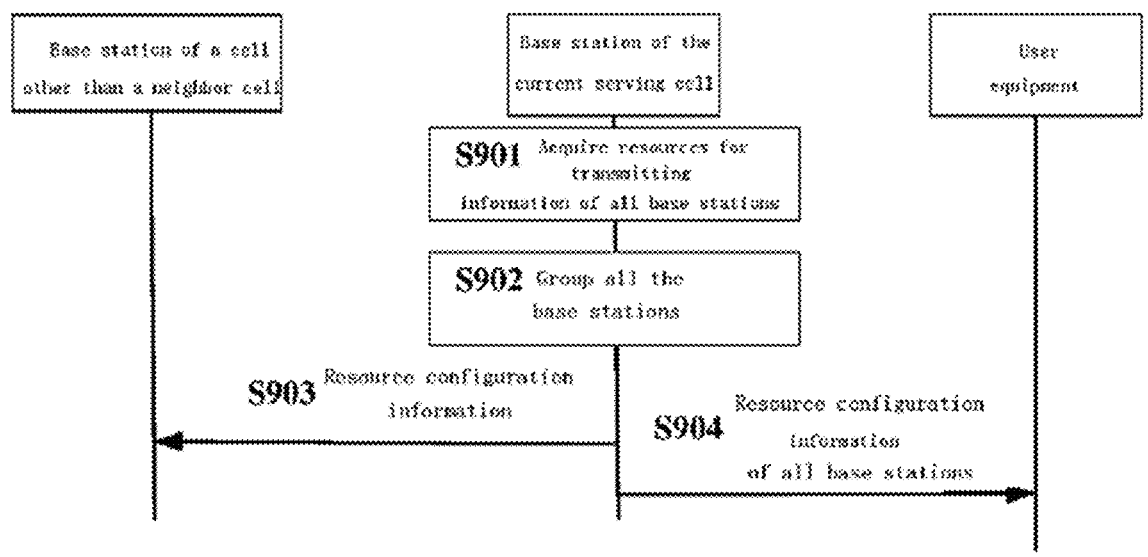
FIG. 12 is a signaling flowchart used for a case of downlink interference according to an embodiment of the present disclosure.

FIG. 12 is a signaling flowchart used for a case of downlink interference, according to an embodiment of the present disclosure. As shown in FIG. 12, in step S901, the base station equipment of the current serving cell acquires information transmitting resources of all base station equipment. Next, in step S902, the base station equipment of the current serving cell groups all the base station equipment according to the information transmitting resources of all the base station equipment, and then generates resource configuration information for the base station equipment that needs resource configuration. It is assumed here that resource configuration information is generated for base station equipment of a cell other than the neighbor cell. Next, in step S903, the base station equipment of the current serving cell transmits the resource configuration information to the base station equipment of the cell other than the neighbor cell. Next, in step S904, the base station equipment of the current serving cell transmits all generated resource configuration information to the user equipment.

It can be seen that, according to an embodiment of the present disclosure, in the case of downlink interference, the base station equipment of the current serving cell of the user equipment can generate resource configuration information for multiple base station equipment according to the interference condition that the user equipment is subjected to, and can transmit the resource configuration information to the multiple base station equipment to be used by the multiple base station equipment to configure information transmitting resources. In this way, the user equipment can be protected from interference of downlink information. In addition, the multiple base station equipment may be base station equipment of cells other than the current serving cell of the user equipment, so that the base station equipment of the non-neighbor cells (geographically adjacent) may coordinate information transmitting resources, which is a new concept for interference coordination.

3. CONFIGURATION EXAMPLE AT A BASE STATION SIDE IN A CASE OF UPLINK INTERFERENCE

The case of downlink interference according to embodiments of the present disclosure is described in detail above, and the case of uplink interference according to embodiments of the present disclosure will be described in detail below.

The block diagram of the structure of the electronic equipment 400 according to an embodiment of the present disclosure as shown in FIG. 5 is taken as an example to illustrate the elimination of uplink interference. Likewise, the electronic equipment 400 herein may be base station equipment in a wireless communication system. The wireless communication system may include multiple base station equipment and multiple unmanned aerial vehicle equipment. Various units of the electronic equipment 400 may be included in a processing circuit. It is noted that the electronic equipment 400 may include one processing circuit or multiple processing circuits. Further, the processing circuit may include various separated functional units to perform various different functions and/or operations. It should be noted that these functional units may be physical entities or logical entities, and units of different names may be implemented by a same physical entity.

According to an embodiment of the present disclosure, the generating unit 410 may generate resource configuration information according to an interference condition that the electronic equipment 400 is subjected to.

According to an embodiment of the present disclosure, the transceiver unit 420 may transmit the resource configuration information to base station equipment of other cells than the neighbor cells of the cell of the electronic equipment 400, to be used by the base station equipment of the other cells to configure information transmitting resources. The current altitude of the user equipment is higher than an altitude threshold.

Similar to the case of downlink interference, the user equipment herein may be unmanned aerial vehicle equipment. When the current altitude of the user equipment is higher than the altitude threshold, the user equipment cannot be considered a general UE.

As described above, according to an embodiment of the present disclosure, the electronic equipment 400 may generate resource configuration information according to an interference condition that the electronic equipment 400 is subjected to, to be transmitted to base station equipment of a cell other than the neighbor cell of the cell of the electronic equipment 400. In this way, the electronic equipment 400 can coordinate information transmitting resources with base station equipment of other cells than the neighbor cell of the cell of the electronic equipment 400, to avoid uplink interference.

According to an embodiment of the present disclosure, the interference determining unit 430 may determine an interference condition that the electronic equipment 400 is subjected to. Specifically, the interference determining unit 430 may determine the interference condition that the electronic equipment 400 is subjected to according to information transmitting resources of user equipment whose distance from the electronic equipment 400 is less than a distance threshold.

According to an embodiment of the present disclosure, the information transmitted by the user equipment may include data information and control information. The control information may include a reference signal. That is, the electronic equipment 400 may determine the interference condition that the electronic equipment 400 is subjected to with respect to data information, according to resources for transmitting data information by user equipment whose distance from the electronic equipment 400 is less than the distance threshold, and the electronic equipment 400 may determine the interference condition that the electronic equipment 400 is subjected to with respect to control information, according to resources for transmitting control information by user equipment whose distance from the electronic equipment 400 is less than the distance threshold.

According to an embodiment of the present disclosure, the distance threshold may be reasonably set according to actual conditions to select user equipment from which the electronic equipment 400 can receive uplink information. That is, the user equipment selected according to the distance threshold is a potential interference source of the electronic equipment 400.

According to an embodiment of the present disclosure, the transceiver unit 420 may receive information transmitting resources of user equipment whose distance from the electronic equipment 400 is less than a distance threshold, from base station equipment of a current serving cell of the user equipment. In the example as shown in FIG. 2, it is assumed that the current serving cell of UAV1 is cell b7, and the current serving cell of UAV2 is cell b9. According to an embodiment of the present disclosure, the base station equipment of the cell A may receive information transmitting resources of the UAV1 from the base station equipment of the cell b7, and may receive information transmitting resources of the UAV2 from the base station equipment of the cell b9.

According to an embodiment of the present disclosure, the transceiver unit 420 may receive, via an S1 interface, information transmitting resources of user equipment whose distance from the electronic equipment 400 is less than the distance threshold from base station equipment of a current serving cell of the user equipment. If the current serving cell of the user equipment whose distance from the electronic equipment 400 is less than the distance threshold is a neighbor cell of the cell of the electronic equipment 400, the transceiver unit 420 may receive the information transmitting resources of the user equipment via an X2 interface.

According to an embodiment of the present disclosure, each base station equipment in the wireless communication system may transmit information transmitting resources of served user equipment to base station equipment whose distance from the user equipment is less than a distance threshold, which can be implemented via the S1 interface or the X2 interface.

The user equipment may report the location information of the user equipment to the base station equipment serving the user equipment, and the base station equipment can learn, via the X2 interface or the S1 interface, location information of base station equipment of the neighbor cells of the cell of the base station equipment, and location information of base station equipment of other cells than the neighbor cells of the cell of the base station equipment, thereby determining all base station equipment whose distance from the user equipment is less than the distance threshold. Still referring to the example shown in FIG. 2, assuming that the base station equipment of the current serving cell b7 of the UAV1 determines that the base station equipment whose distance from the UAV1 is less than the distance threshold is base station equipment of the cells A, a1, b8, and a2, it may transmit information transmitting resources of UAV1 to the base station equipment of the four cells. In this way, the base station equipment of cell A can learn information transmitting resources of all user equipment whose distance from the base station equipment is less than the distance threshold.

According to an embodiment of the present disclosure, when the information transmitting resources of multiple user equipment whose distance from the electronic equipment 400 is less than the distance threshold are the same, the interference determination unit 430 may determine that the electronic equipment 400 is interfered. Here, the information transmitting resources may include a spectrum resource for transmitting information. For example, when the spectrum resources used by the multiple user equipment for transmitting information are the same, the interference determining unit 430 may determine that the electronic equipment 400 is interfered. Referring to the example shown in FIG. 2, the UAV1 and the UAV2 are both at a distance less than the distance threshold from the base station equipment of the cell A, and the resources used by the UAV1 and the UAV2 for transmitting the uplink information are the same, so that the base station equipment of the cell A can receive the uplink information from both UAV1 and UAV2, thereby causing interference.

According to an embodiment of the present disclosure, when the electronic equipment 400 is interfered, the generating unit 410 may generate resource configuration information for the base station equipment of current serving cells of all or a part of the multiple user equipment causing the interference. The transceiver unit 420 may transmit the resource configuration information to the respective base station equipment, to be used by the respective base station equipment to reconfigure information transmitting resources for served user equipment.

According to an embodiment of the present disclosure, the generating unit 410 may generate resource configuration information for all of the multiple user equipment causing interference. The resource configuration information may include identification information of the user equipment causing interference, or the like, such that the base station equipment that receives the resource configuration information re-allocates the information transmitting resources for the user equipment, such as spectrum resources for transmitting the uplink information. In the example shown in FIG. 2, the base station equipment of the cell A may generate resource configuration information for the base station equipment of the cell b7, including the identification information of the UAV1. When the base station equipment of the cell b7 receives this resource configuration information, it learns that the UAV1 causes interference to the base station equipment of the cell A, and thus re-allocates the spectrum resource for transmitting uplink information for the UAV1. Similarly, the base station equipment of the cell A may generate resource configuration information for the base station equipment of the cell b9, including the identification information of the UAV2. When the base station equipment of the cell b9 receives this resource configuration information, it learns that the UAV2 causes interference to the base station equipment of the cell A, and thus re-allocates the spectrum resource for transmitting the uplink information for the UAV2.

According to an embodiment of the present disclosure, the generating unit 410 may generate resource configuration information for a part of multiple user equipment causing interference. For example, if the number of user equipment causing interference is N (where N is an integer greater than 1), the generating unit 410 may generate resource configuration information for N−1 of the user equipment. That is, resources are reallocated for one of the multiple user equipment. In the example shown in FIG. 2, the base station equipment of the cell A may generate resource configuration information for the base station equipment of the cell b7, and does not generate resource configuration information for the base station equipment of the cell b9. Alternatively, the base station equipment of the cell A may generate resource configuration information for the base station equipment of the cell b9, and does not generate resource configuration information for the base station equipment of the cell b7. In this way, the number of generated resource configuration information can be reduced, thereby reducing signaling overhead and avoiding unnecessary impact on user equipment.

As described above, according to the embodiment of the present disclosure, when multiple user equipment close to the base station equipment use the same resources to transmit uplink information, the base station equipment may receive uplink information transmitted by multiple user equipment, thereby causing interference. In this case, the electronic equipment 400 may generate resource configuration information for all or a part of the user equipment and transmit the resource configuration information to the respective base station equipment to coordinate the resources for transmitting uplink information, thereby solving the interference problem. The user equipment causing the interference may be in the cell of the electronic equipment 400, or a neighbor cell of the cell of the electronic equipment 400, or a cell other than the neighbor cell of the cell of the electronic equipment 400. Therefore, according to an embodiment of the present disclosure, the electronic equipment 400 may transmit resource configuration information to base station equipment of a cell other than a neighbor cell of the cell of the electronic equipment 400. Further, the electronic equipment 400 may also transmit resource configuration information to the base station equipment of the neighbor cell of the cell of the electronic equipment 400.

According to an embodiment of the present disclosure, the electronic equipment 400 may transmit resource configuration information via an X2 interface or an S1 interface. For example, the electronic equipment 400 may transmit resource configuration information to the MME via the S1 interface, so that other base station equipment can obtain their resource configuration information from the MME via the S1 interface. Apparently, if the base station equipment that receives the resource configuration information is the base station equipment of the neighbor cell of the cell of the electronic equipment 400, the electronic equipment 400 may send the resource configuration information via the X2 interface, which is not limited in the present disclosure.

In addition, when the user equipment causing the interference is in the cell of the electronic equipment 400, the generating unit 410 may generate resource configuration information for the electronic equipment 400, to be used by the electronic equipment 400 to reconfigure information transmitting resources for its user equipment.

Figure 13:
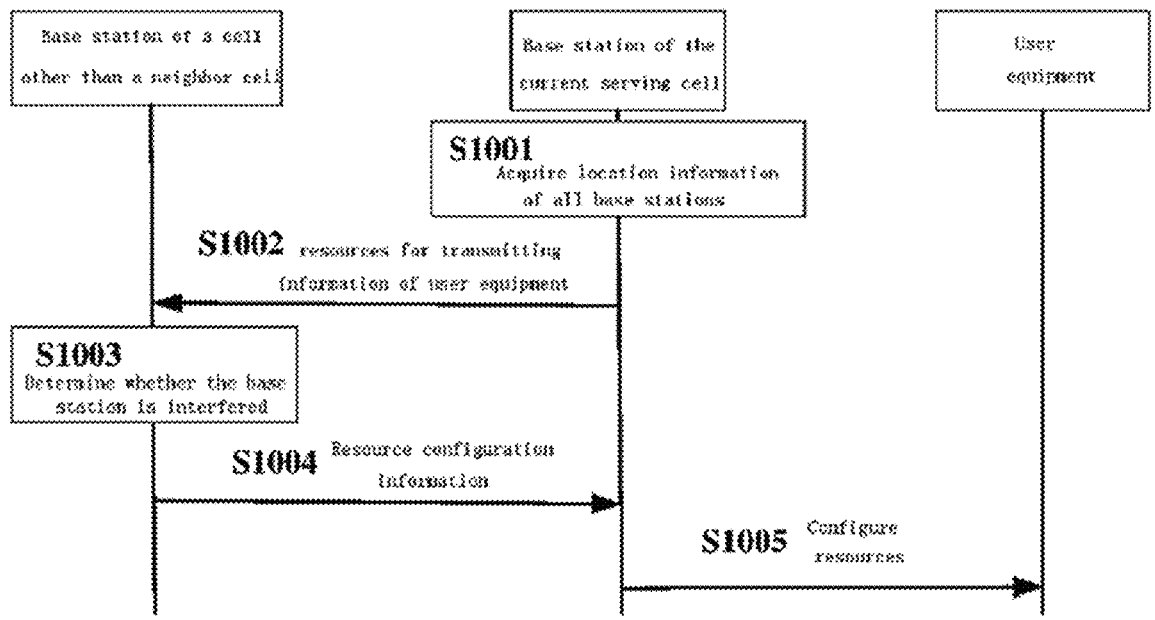
FIG. 13 is a signaling flowchart used for a case of uplink interference according to an embodiment of the present disclosure.

FIG. 13 is a signaling flowchart used for a case of uplink interference according to an embodiment of the present disclosure. As shown in FIG. 13, in step S1001, the base station equipment of the current serving cell of the user equipment may acquire location information of all base station equipment in the wireless communication system, thereby determining base station equipment whose distance from the user equipment is less than a distance threshold. Next, in step S1002, the base station equipment of the current serving cell transmits information transmitting resources of the user equipment to the base station equipment whose distance from the user equipment is less than a distance threshold. It is assumed that the base station equipment of a cell other than a neighbor cell receives the information transmitting resources. Next, in step S1003, the base station equipment of the cell other than the neighbor cell determines whether the base station equipment is interfered, and generates resource configuration information in the case of being interfered. It is assumed here that the user equipment causes interference to the base station equipment of the cell other than the neighbor cell. Next, in step S1004, resource configuration information is transmitted to the base station equipment of the current serving cell. Next, in step S1005, the base station equipment of the current serving cell performs resource configuration for the user equipment, that is, reconfigures the information transmitting resources for the user equipment. As described above, the user equipment causing interference to the base station equipment of the cell other than the neighbor cell changes the resources for transmitting information, thereby avoiding uplink interference to the base station equipment of the cell other than the neighbor cell.

It can be seen that, according to an embodiment of the present disclosure, in the case of uplink interference, the base station equipment may determine the interference condition that the base station equipment is subjected to according to information transmitting resources used by the user equipment in the vicinity, and may transmit the resource configuration information to the base station equipment serving the user equipment causing the interference, so that the base station equipment reconfigures resources for the user equipment causing the interference. In this way, the base station equipment can be protected from interference of uplink information. In addition, the current serving cell of the user equipment causing the interference may be a cell other than the neighbor cell of the interfered base station equipment, so that the base station equipment of non-neighbor cells can coordinate information transmitting resources, which is a new concept for interference coordination.

4. METHOD EMBODIMENTS

Below a wireless communication method performed by electronic equipment in a wireless communication system according to an embodiment of the present disclosure will be described in detail. The electronic equipment herein may be the electronic equipment 400, and thus all of the embodiments described above with respect to the electronic equipment 400 are applicable thereto.

Figure 14:
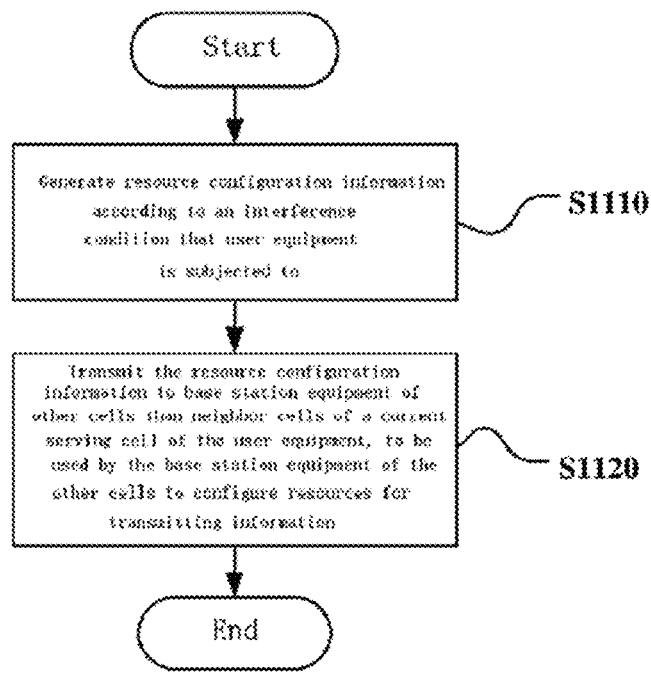
FIG. 14 is a flowchart of a wireless communication method performed by electronic equipment in a wireless communication system according to an embodiment of the present disclosure.

FIG. 14 is a flowchart of a wireless communication method performed by electronic equipment in a wireless communication system according to an embodiment of the present disclosure.

As shown in FIG. 14, in step S1110, resource configuration information is generated according to an interference condition that user equipment (UE) is subjected to, where a current altitude of the UE is higher than an altitude threshold.

Next, in step S1120, the resource configuration information is transmitted to base station equipment of other cells than neighbor cells of a current serving cell of the UE, to be used by the base station equipment of the other cells to configure information transmitting resources.

Preferably, the method further includes determining the interference condition that the UE is subjected to, according to information transmitting resources of the electronic equipment, information transmitting resources of base station equipment of the neighbor cells, and information transmitting resources of the base station equipment of the other cells.

Preferably, the method further includes determining the information transmitting resources of the electronic equipment, the information transmitting resources of the base station equipment of the neighbor cells, and the information transmitting resources of the base station equipment of the other cells according to physical cell identifiers (PCIs) of the electronic equipment, PCIs of the base station equipment of the neighbor cells, and PCIs of the base station equipment of the other cells.

Preferably, the method further includes acquiring, via an X2 interface, the information transmitting resources of the base station equipment of the neighbor cells and the information transmitting resources of the base station equipment of the other cells.

Preferably, the method further includes acquiring, via an S1 interface, the information transmitting resources of the base station equipment of the neighbor cells and the information transmitting resources of the base station equipment of the other cells.

Preferably, the method further includes grouping the electronic equipment, the base station equipment of the neighbor cells, and the base station equipment of the other cells according to the information transmitting resources of the electronic equipment, the information transmitting resources of the base station equipment of the neighbor cells, and the information transmitting resources of the base station equipment of the other cells.

Preferably, the method further includes generating the resource configuration information to cause equipment in a same group to perform multiplexing on the information transmitting resources.

Preferably, the method further includes generating the resource configuration information to cause the equipment in the same group to perform time division multiplexing, frequency division multiplexing or space division multiplexing on the information transmitting resources.

Preferably, the method further includes determining the interference condition that the UE is subjected to further according to location information of the UE.

Preferably, information transmitted by the base station equipment of the other cells includes data information and control information.

Preferably, the control information includes a reference signal.

Preferably, the electronic equipment is base station equipment in the wireless communication system, and the UE is unmanned aerial vehicle equipment.

Figure 15:
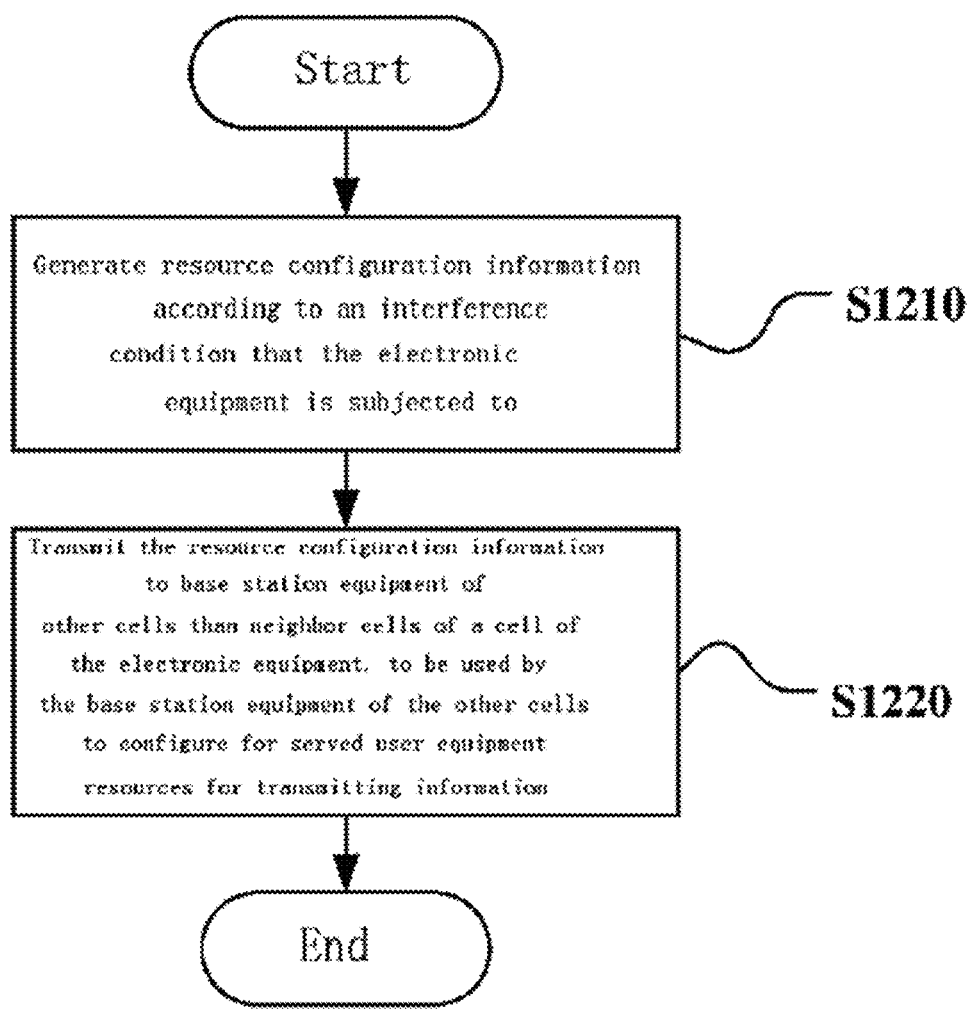
FIG. 15 is a flowchart of a wireless communication method performed by electronic equipment in a wireless communication system according to another embodiment of the present disclosure.

FIG. 15 is a flowchart of a wireless communication method performed by electronic equipment in a wireless communication system according to another embodiment of the present disclosure.

As shown in FIG. 15, in step S1210, resource configuration information is generated according to an interference condition that the electronic equipment is subjected to.

Next, in step S1220, the resource configuration information is transmitted to base station equipment of other cells than neighbor cells of a cell of the electronic equipment, to be used by the base station equipment of the other cells to configure for served user equipment (UE) information transmitting resources, where a current altitude of the UE is higher than an altitude threshold.

Preferably, the method further includes determining the interference condition that the electronic equipment is subjected to, according to information transmitting resources of UE whose distance from the electronic equipment is less than a distance threshold.

Preferably, the method further includes receiving the information transmitting resources of the UE from base station equipment of a current serving cell of the UE whose distance from the electronic equipment is less than the distance threshold.

Preferably, the method further includes determining that the electronic equipment is interfered, if information transmitting resources of multiple UEs whose distance from the electronic equipment is less than the distance threshold are the same.

Preferably, the method further includes, when the electronic equipment is interfered, transmitting the resource configuration information to base station equipment of current serving cells of a part or all of the multiple UEs, to be used by the base station equipment to reconfigure for served UE information transmitting resources.

Preferably, information transmitted by the UE includes data information and control information.

Preferably, the control information includes a reference signal.

Preferably, the electronic equipment is base station equipment in the wireless communication system, and the UE is unmanned aerial vehicle equipment.

According to embodiments of the present disclosure, the subject performing the above method may the electronic equipment 400 according to embodiments of the present disclosure, and thus all of the embodiments described above with respect to the electronic equipment 400 are applicable thereto.

5. APPLICATION EXAMPLES

The technology in the present disclosure may be applied in various productions. For example, the base station in the present disclosure may be implemented as an evolved node B (eNB) of any type, such as a macro eNB and a small eNB, or a gNB (a base station in a 5G system) of any type. The small eNB may be an eNB which covers a cell smaller than a macro cell, such as a pico eNB, a micro eNB and a home (femto) eNB. Alternatively, the base station may be implemented as any other type of base station, such as a Node B and a base transceiver station (BTS). The base station may include: a main body (also referred to as base station equipment) configured to control the wireless communication, and one or more remote radio heads (RRH) provided at a different site from the main body.

First Application Example

Figure 16:
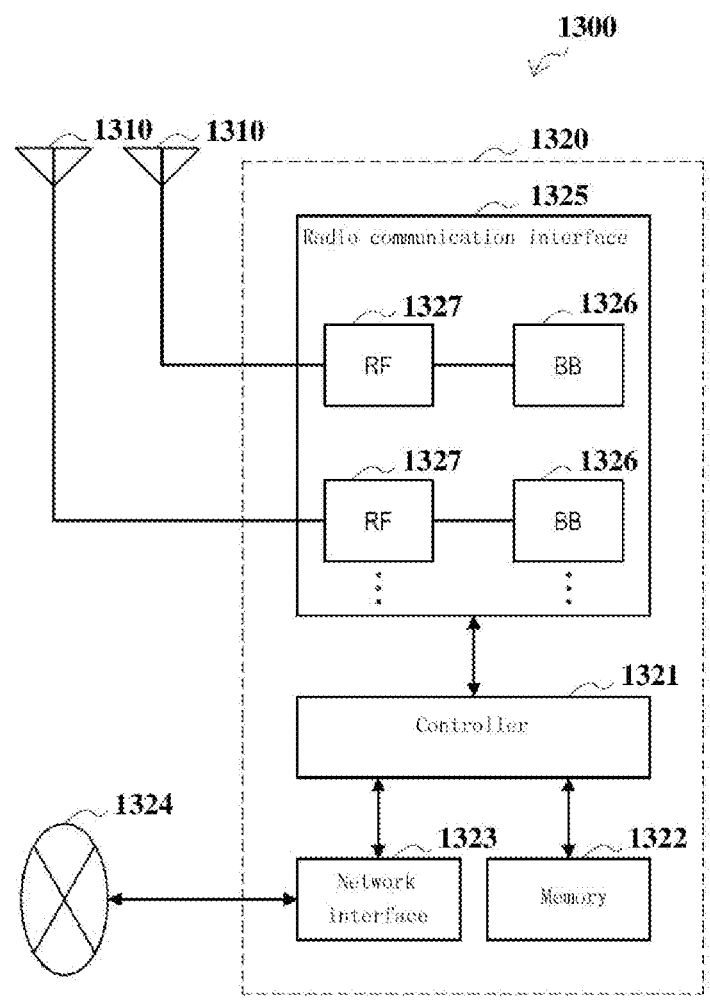
FIG. 16 is a block diagram showing a first example of a schematic configuration of an evolved Node-B (eNB)

FIG. 16 is a block diagram illustrating a first example of a schematic configuration of an eNB to which the technology of the present disclosure may be applied. An eNB 1300 includes one or more antennas 1310 and base station equipment 1320. Each antenna 1310 and the base station equipment 1320 may be connected to each other via an RF cable.

Each of the antennas 1310 includes a single or multiple antenna elements (such as multiple antenna elements included in an MIMO antenna), and is used for the base station equipment 1320 to transmit and receive radio signals. The eNB 1300 may include the multiple antennas 1310, as illustrated in FIG. 16. For example, the multiple antennas 1310 may be compatible with multiple frequency bands used by the eNB 1300. Although FIG. 16 illustrates the example in which the eNB 1300 includes the multiple antennas 1310, the eNB 1300 may also include a single antenna 1310.

The base station equipment 1320 includes a controller 1321, a memory 1322, a network interface 1323, and a radio communication interface 1325.

The controller 1321 may be, for example, a CPU or a DSP, and operates various functions of a higher layer of the base station equipment 1320. For example, the controller 1321 generates a data packet from data in signals processed by the radio communication interface 1325, and transfers the generated packet via the network interface 1323. The controller 1321 may bundle data from multiple base band processors to generate the bundled packet, and transfer the generated bundled packet. The controller 1321 may have logical functions of performing control such as radio resource control, radio bearer control, mobility management, admission control, and scheduling. The control may be performed in corporation with an eNB or a core network node in the vicinity. The memory 1322 includes RAM and ROM, and stores a program that is executed by the controller 1321, and various types of control data (such as a terminal list, transmission power data, and scheduling data).

The network interface 1323 is a communication interface for connecting the base station equipment 1320 to a core network 1324. The controller 1321 may communicate with a core network node or another eNB via the network interface 1323. In that case, the eNB 1300, and the core network node or the other eNB may be connected to each other through a logical interface (such as an S1 interface and an X2 interface). The network interface 1323 may also be a wired communication interface or a radio communication interface for radio backhaul. If the network interface 1323 is a radio communication interface, the network interface 1323 may use a higher frequency band for radio communication than a frequency band used by the radio communication interface 1325.

The radio communication interface 1325 supports any cellular communication scheme such as Long Term Evolution (LTE) and LTE-Advanced, and provides radio connection to a terminal positioned in a cell of the eNB 1300 via the antenna 1310. The radio communication interface 1325 may typically include, for example, a baseband (BB) processor 1326 and an RF circuit 1327. The BB processor 1326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1326 may have a part or all of the above-described logical functions instead of the controller 1321. The BB processor 1326 may be a memory that stores a communication control program, or a module that includes a processor and a related circuit configured to execute the program. Updating the program may allow the functions of the BB processor 1326 to be changed. The module may be a card or a blade that is inserted into a slot of the base station equipment 1320. Alternatively, the module may also be a chip that is mounted on the card or the blade. Meanwhile, the RF circuit 1327 may include, for example, a mixer, a filter, and an amplifier, and transmits and receives radio signals via the antenna 1310.

The radio communication interface 1325 may include the multiple BB processors 1326, as illustrated in FIG. 16. For example, the multiple BB processors 1326 may be compatible with multiple frequency bands used by the eNB 1300. The radio communication interface 1325 may include the multiple RF circuits 1327, as illustrated in FIG. 16. For example, the multiple RF circuits 1327 may be compatible with multiple antenna elements. Although FIG. 16 illustrates the example in which the radio communication interface 1325 includes the multiple BB processors 1326 and the multiple RF circuits 1327, the radio communication interface 1325 may also include a single BB processor 1326 or a single RF circuit 1327.

Second Application Example

Figure 17:
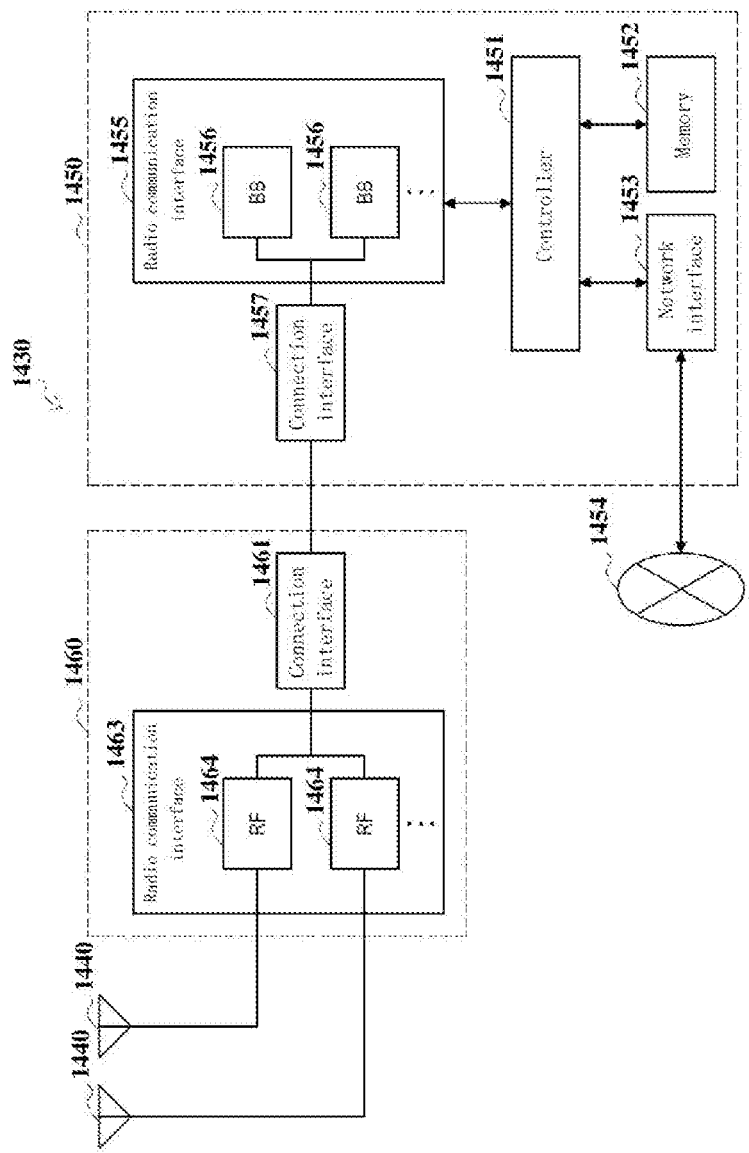
FIG. 17 is a block diagram showing a second example of a schematic configuration of an eNB.

FIG. 17 is a block diagram illustrating a second example of a schematic configuration of an eNB to which the technology of the present disclosure may be applied. An eNB 1430 includes one or more antennas 1440, base station equipment 1450, and an RRH 1460. Each antenna 1440 and the RRH 1460 may be connected to each other via an RF cable. The base station equipment 1450 and the RRH 1460 may be connected to each other via a high speed line such as an optical fiber cable.

Each of the antennas 1440 includes a single or multiple antenna elements (such as multiple antenna elements included in an MIMO antenna), and is used for the RRH 1460 to transmit and receive radio signals. The eNB 1430 may include the multiple antennas 1440, as illustrated in FIG. 17. For example, the multiple antennas 1440 may be compatible with multiple frequency bands used by the eNB 1430. Although FIG. 17 illustrates the example in which the eNB 1430 includes the multiple antennas 1440, the eNB 1430 may also include a single antenna 1440.

The base station equipment 1450 includes a controller 1451, a memory 1452, a network interface 1453, a radio communication interface 1455, and a connection interface 1457. The controller 1451, the memory 1452, and the network interface 1453 are the same as the controller 1321, the memory 1322, and the network interface 1323 described with reference to FIG. 16.

The radio communication interface 1455 supports any cellular communication scheme (such as LTE and LTE-Advanced), and provides radio communication to a terminal positioned in a sector corresponding to the RRH 1460 via the RRH 1460 and the antenna 1440. The radio communication interface 1455 may typically include, for example, a BB processor 1456. The BB processor 1456 is the same as the BB processor 1326 described with reference to FIG. 16, except the BB processor 1456 is connected to the RF circuit 1464 of the RRH 1460 via the connection interface 1457. The radio communication interface 1455 may include the multiple BB processors 1456, as illustrated in FIG. 17. For example, the multiple BB processors 1456 may be compatible with multiple frequency bands used by the eNB 1430. Although FIG. 17 illustrates the example in which the radio communication interface 1455 includes the multiple BB processors 1456, the radio communication interface 1455 may also include a single BB processor 1456.

The connection interface 1457 is an interface for connecting the base station equipment 1450 (radio communication interface 1455) to the RRH 1460. The connection interface 1457 may also be a communication module for communication in the above-described high speed line that connects the base station equipment 1450 (radio communication interface 1455) to the RRH 1460.

The RRH 1460 includes a connection interface 1461 and a radio communication interface 1463.

The connection interface 1461 is an interface for connecting the RRH 1460 (radio communication interface 1463) to the base station equipment 1450. The connection interface 1461 may also be a communication module for communication in the above-described high speed line.

The radio communication interface 1463 transmits and receives radio signals via the antenna 1440. The radio communication interface 1463 may typically include, for example, the RF circuit 1464. The RF circuit 1464 may include, for example, a mixer, a filter, and an amplifier, and transmits and receives radio signals via the antenna 1440. The radio communication interface 1463 may include multiple RF circuits 1464, as illustrated in FIG. 17. For example, the multiple RF circuits 1464 may support multiple antenna elements. Although FIG. 17 illustrates the example in which the radio communication interface 1463 includes the multiple RF circuits 1464, the radio communication interface 1463 may also include a single RF circuit 1464.

In the eNB 1300 and eNB 1430 shown in FIG. 16 and FIG. 17, the generating unit 410, the interference determining unit 430 and the configuration unit 440 described with reference to FIG. 5 may be implemented by the controller 1321 and/or the controller 1451. For example, the controller 1321 and/or the controller 1451 may perform the functions of generating the resource configuration information, determining the interference and configuring the resources by executing instructions stored in a corresponding storage.

The preferred embodiments are described with reference to the drawings, but the present disclosure is not limited thereto. Those skilled in the art may obtain various alternatives and modifications within the scope of the appending claims, and it is understood that all the alternatives and modifications are within the technical scope of the present disclosure.

For example, the units shown in dashed boxes in the functional block diagrams in the drawings indicate that the functional units are optional in the respective devices, and the various optional functional units may be combined in an appropriate manner to achieve required features.

For example, multiple functions of a unit in the above embodiments may be performed by separated units. Alternatively, multiple functions performed by multiple units in the above embodiments may be performed by separated units. Furthermore, one of the above functions may be performed by multiple units. Apparently, such configurations are within the technical scope of the present disclosure.

In the description, the steps described in the flowchart may be performed in a time sequence as listed, or may be performed in parallel or separately instead of being performed in the time sequence. Furthermore, even for the steps performed in the time sequence, the performing order may be changed properly.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined by the appended claims and their equivalents.

The invention claimed is:

1. Electronic equipment in a wireless communication system, comprising a processing circuit configured to:
   generate resource configuration information according to an interference condition that user equipment (UE) is subjected to, a current altitude of the UE being higher than an altitude threshold;
   transmit the resource configuration information to base station equipment of other cells than neighbor cells of a current serving cell of the UE, to be used by the base station equipment of the other cells to configure information transmitting resources; and
   determine the interference condition that the UE is subjected to, according to information transmitting resources of the electronic equipment, information transmitting resources of base station equipment of the neighbor cells, and information transmitting resources of the base station equipment of the other cells.

2. The electronic equipment according to claim 1, wherein the processing circuit is further configured to:
   determine the information transmitting resources of the electronic equipment, the information transmitting resources of the base station equipment of the neighbor cells, and the information transmitting resources of the base station equipment of the other cells according to physical cell identifiers (PCIs) of the electronic equipment, PCIS of the base station equipment of the neighbor cells, and PCIs of the base station equipment of the other cells.

3. The electronic equipment according to claim 1, wherein the processing circuit is further configured to:
   acquire, via an X2 interface, the information transmitting resources of the base station equipment of the neighbor cells and the information transmitting resources of the base station equipment of the other cells.

4. The electronic equipment according to claim 1, wherein the processing circuit is further configured to:
   acquire, via an S1 interface, the information transmitting resources of the base station equipment of the neighbor cells and the information transmitting resources of the base station equipment of the other cells.

5. The electronic equipment according to claim 1, wherein the processing circuit is further configured to:
   group the electronic equipment, the base station equipment of the neighbor cells, and the base station equipment of the other cells according to the information transmitting resources of the electronic equipment, the information transmitting resources of the base station equipment of the neighbor cells, and the information transmitting resources of the base station equipment of the other cells.

6. The electronic equipment according to claim 5, wherein the processing circuit is further configured to:
   generate the resource configuration information to cause equipment in a same group tip perform multiplexing on the information transmitting resources.

7. The electronic equipment according to claim 6, wherein the processing circuit is further configured to:
   generate the resource configuration information to cause the equipment in the same group to perform time division multiplexing, frequency division multiplexing or space division multiplexing on the information transmitting resources.

8. The electronic equipment according to claim 1, wherein the processing circuit is further configured to:
   determine the interference condition that the UE is subjected to further according to location information of the UE.

9. The electronic equipment according to claim 1, wherein information transmitted by the base station equipment of the other cells comprises data information and control information.

10. The electronic equipment according to claim 9, wherein the control information comprises a reference signal.

11. The electronic equipment according to claim 1, wherein the electronic equipment is base station equipment in the wireless communication system, and the UE is unmanned aerial vehicle equipment.

12. Electronic equipment in a wireless communication system, comprising a processing circuit configured to:
   generate resource configuration information according to an interference condition that the electronic equipment is subjected to;
   transmit the resource configuration information to base station equipment of other cells than neighbor cells of a cell of the electronic equipment, to be used by the base station equipment of the other cells to configure served user equipment (UE) information transmitting resources;
   select a UE for which a distance between the UE and the electronic equipment is less than a distance threshold and a current altitude of the UE is higher than an altitude threshold;
   determine the interference condition that the electronic equipment is subjected to according to information transmitting resources of the selected UE whose distance from the electronic equipment is less than a distance threshold; and
   determine that the electronic equipment is interfered, if information transmitting resources of a plurality of UEs whose distance from the electronic equipment is less than the distance threshold are the same.

13. The electronic equipment according to claim 12, wherein the processing circuit is further configured to:
   receive the information transmitting resources of the selected UE from base station equipment of a current serving cell of the selected UE whose distance from the electronic equipment is less than the distance threshold.

14. The electronic equipment according to claim 12, wherein the processing circuit is further configured to:
   when the electronic equipment is interfered, transmit the resource configuration information to base station equipment of current serving cells of a part or all of the plurality of UEs, to be used by the base station equipment to reconfigure for the served UE information transmitting resources.

15. The electronic equipment according to claim 12, wherein information transmitted by the selected UE comprises data information and control information.

16. The electronic equipment according to claim 15, wherein the control information comprises a reference signal.

17. A wireless communication method performed by electronic equipment in a wireless communication system, comprising:
   generating resource configuration information according to an interference condition that user equipment (UE) is subjected to, a current altitude of the UE is higher than an altitude threshold;
   transmitting the resource configuration information to base station equipment of other cells than neighbor cells of a current serving cell of the UE, to be used by the base station equipment of the other cells to configure information transmitting resources; and determining the interference condition that the UE is subjected to, according to information transmitting resources of the electronic equipment, information transmitting resources of base station equipment of the neighbor cells, and information transmitting resources of the base station equipment of the other cell.

* * * * *